United States Patent
Hubert

(10) Patent No.: US 9,435,694 B2
(45) Date of Patent: Sep. 6, 2016

(54) OUTSIDE AIR TEMPERATURE MEASUREMENT DEVICE AND METHOD

(71) Applicant: Kelsey-Hayes Company, Livonia, MI (US)

(72) Inventor: Thomas Gregory Hubert, Necedah, WI (US)

(73) Assignee: Kelsey-Hayes Company, Livonia, MI (US)

(*) Notice: Subject to any disclaimer, the term of this patent is extended or adjusted under 35 U.S.C. 154(b) by 286 days.

(21) Appl. No.: 14/166,500

(22) Filed: Jan. 28, 2014

(65) Prior Publication Data

US 2014/0269823 A1    Sep. 18, 2014

Related U.S. Application Data

(60) Provisional application No. 61/781,978, filed on Mar. 14, 2013.

(51) Int. Cl.
| | | |
|---|---|---|
| *G01K 3/04* | (2006.01) | |
| *G01K 1/20* | (2006.01) | |
| *G01K 7/42* | (2006.01) | |

(52) U.S. Cl.
CPC . *G01K 3/04* (2013.01); *G01K 1/20* (2013.01); *G01K 7/42* (2013.01); *G01K 2201/02* (2013.01)

(58) Field of Classification Search
CPC ............ G01K 1/20; G01K 7/42; G01K 3/04; G01K 2201/02
USPC ........... 374/141, 109, 134; 701/36; 340/449, 340/588; 702/130, 189, 99
See application file for complete search history.

(56) References Cited

U.S. PATENT DOCUMENTS

| | | | | |
|---|---|---|---|---|
| 5,033,473 A | * | 7/1991 | Wang | A61B 5/0472 600/509 |
| 5,416,728 A | * | 5/1995 | Rudzewicz | G01K 1/20 340/449 |
| 5,737,243 A | * | 4/1998 | Wallrafen | G01K 1/20 340/449 |
| 5,803,608 A | * | 9/1998 | Randoll | G01K 7/42 374/112 |
| 6,974,251 B2 | * | 12/2005 | DeRonne | G01K 1/20 374/141 |
| 7,599,812 B2 | * | 10/2009 | Kyrtsos | G01K 1/20 702/130 |
| 8,577,514 B2 | * | 11/2013 | Kyrtsos | B60H 1/00807 374/144 |
| 2003/0101026 A1 | * | 5/2003 | Rabinowitz | G01J 3/28 702/189 |
| 2004/0184509 A1 | * | 9/2004 | DeRonne | G01K 1/20 374/141 |
| 2006/0209921 A1 | * | 9/2006 | Brown | G01K 1/20 374/109 |

OTHER PUBLICATIONS

European Search Report EP 14 02 0030 with Written Opinion mailed Aug. 11, 2014.

* cited by examiner

*Primary Examiner* — Lisa Caputo
*Assistant Examiner* — Jonathan Dunlap
(74) *Attorney, Agent, or Firm* — Tarolli, Sundheim, Covell & Tummino LLP

(57) ABSTRACT

An outside air temperature measurement device and method for vehicles derives a useable final value of the outside air temperature within seconds of the beginning of vehicle movement by developing a mathematical expression (i.e., model) for the exponential data series while discriminating against thermal noise components existing in the measurement data.

9 Claims, 25 Drawing Sheets

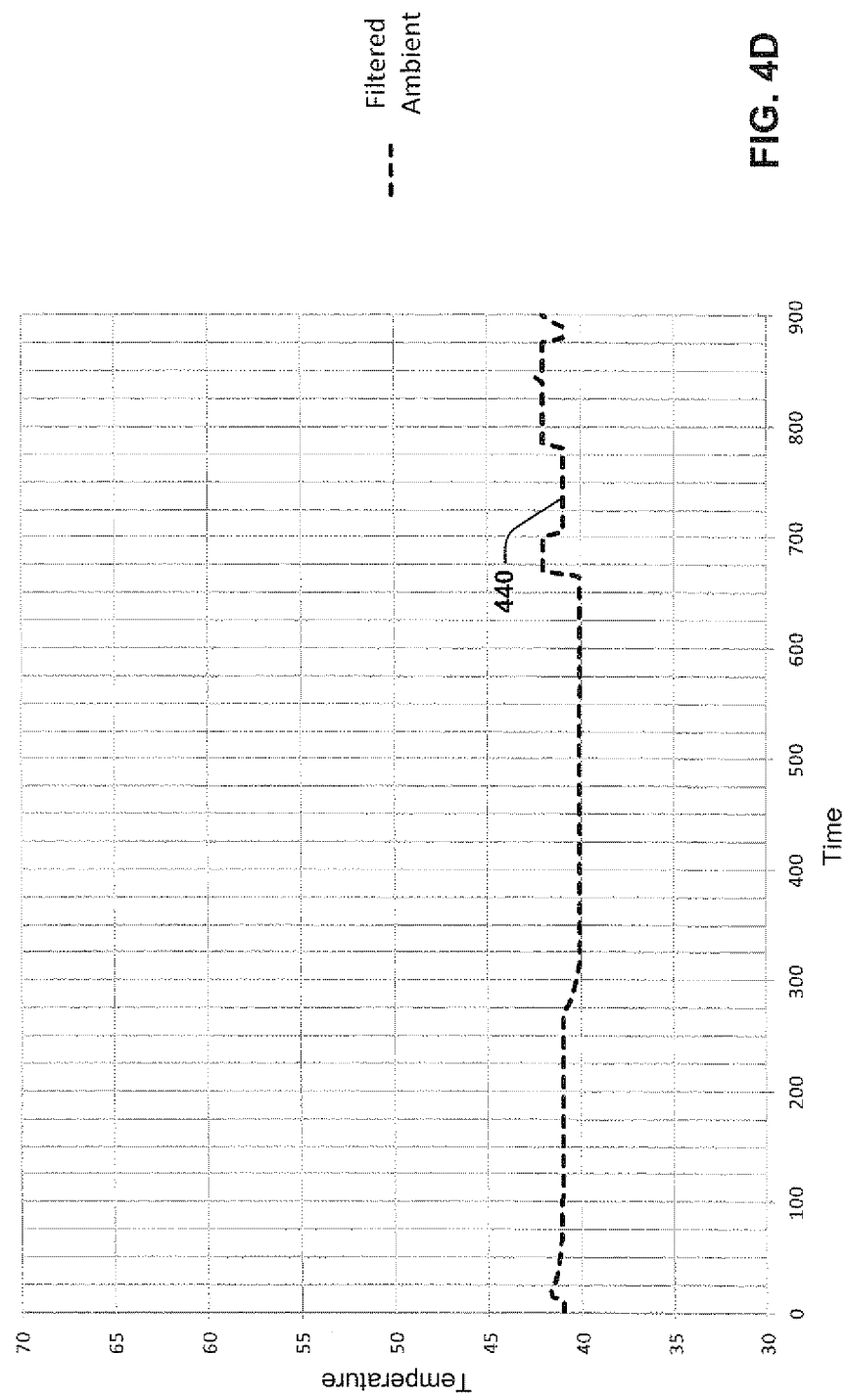

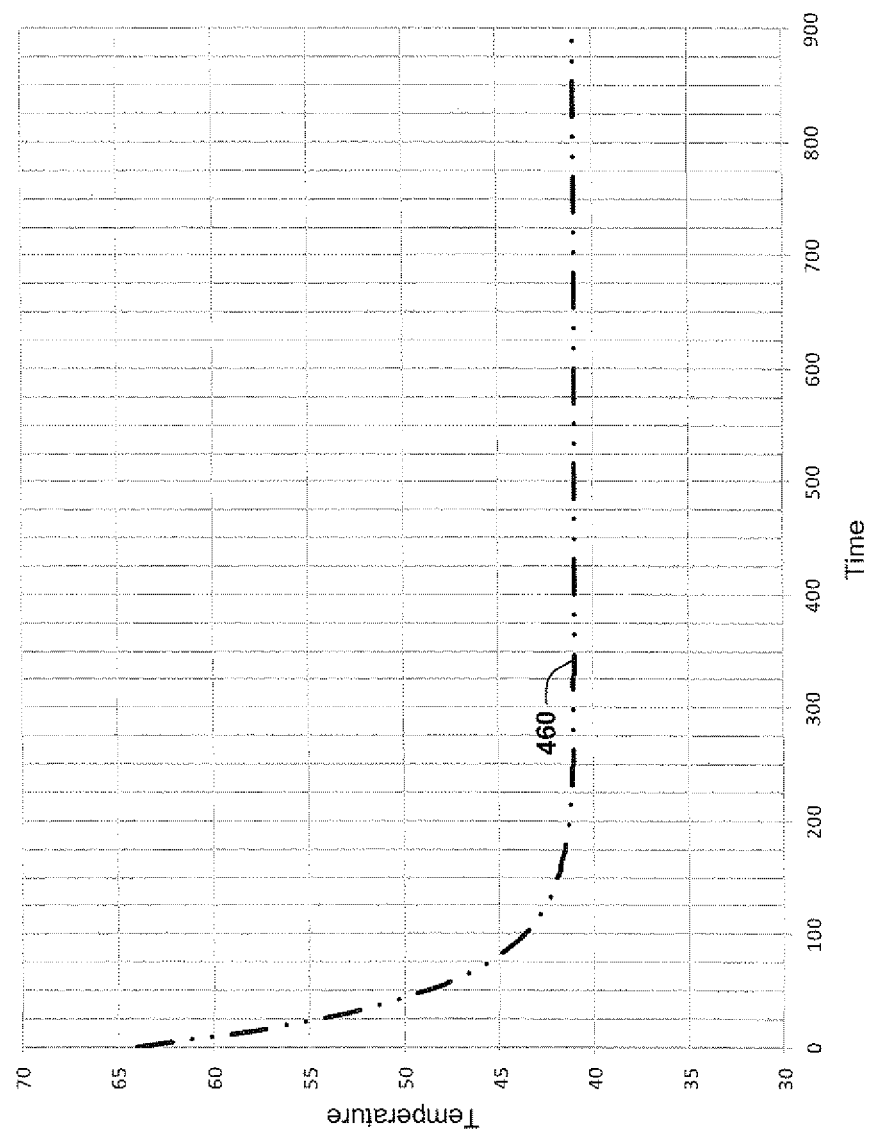

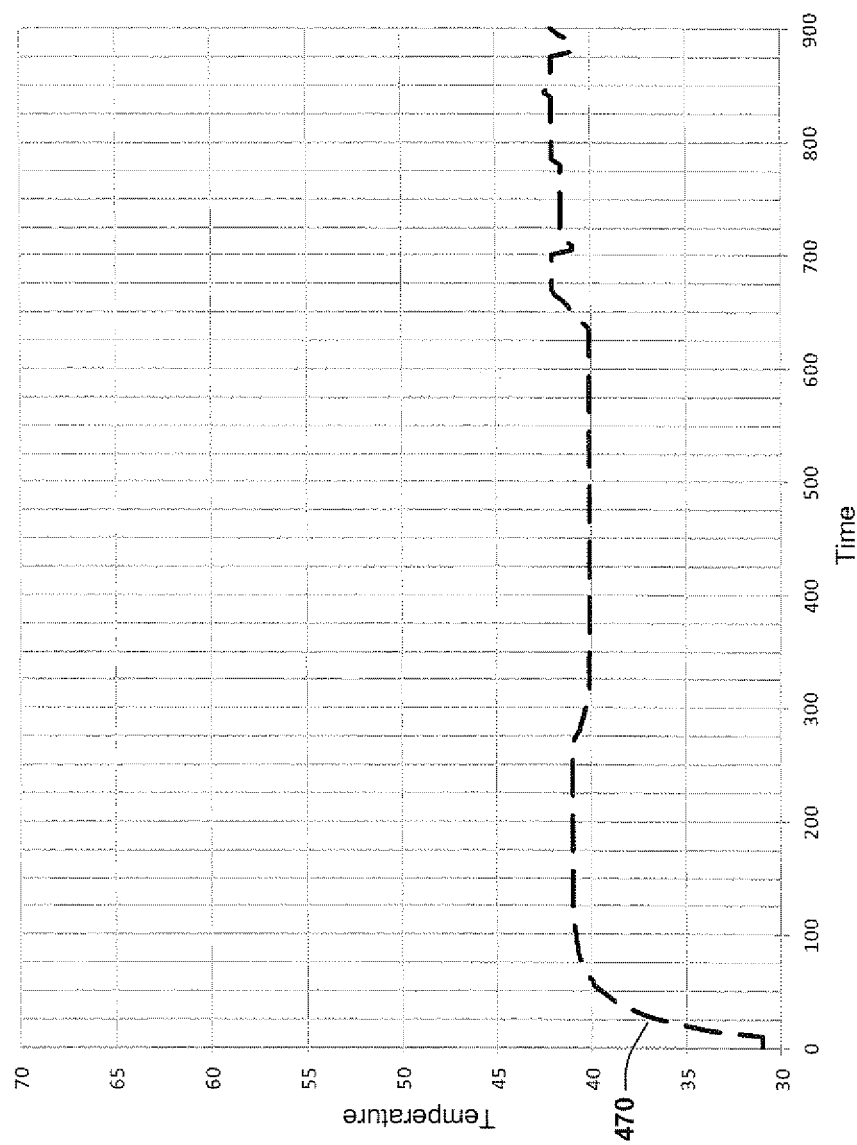

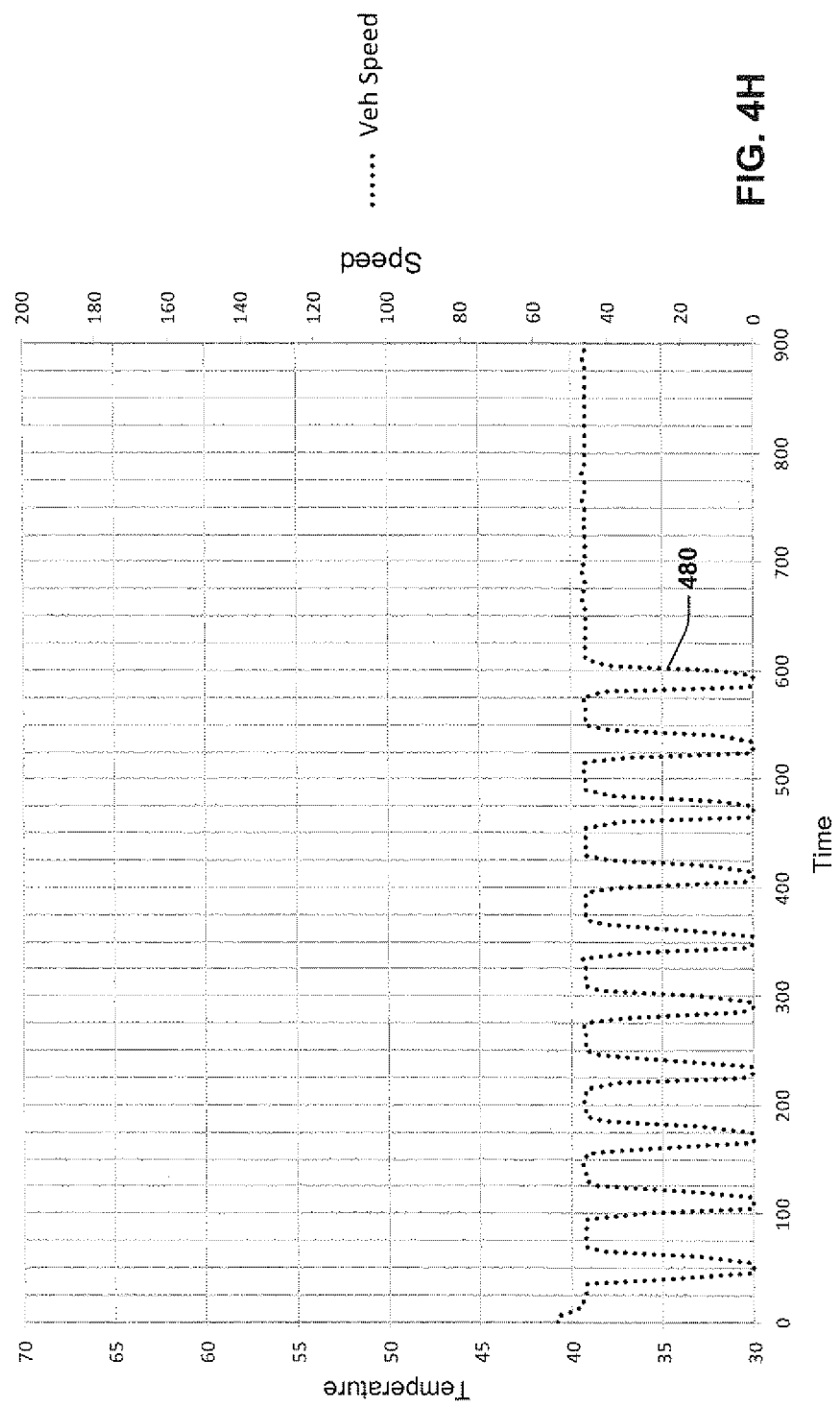

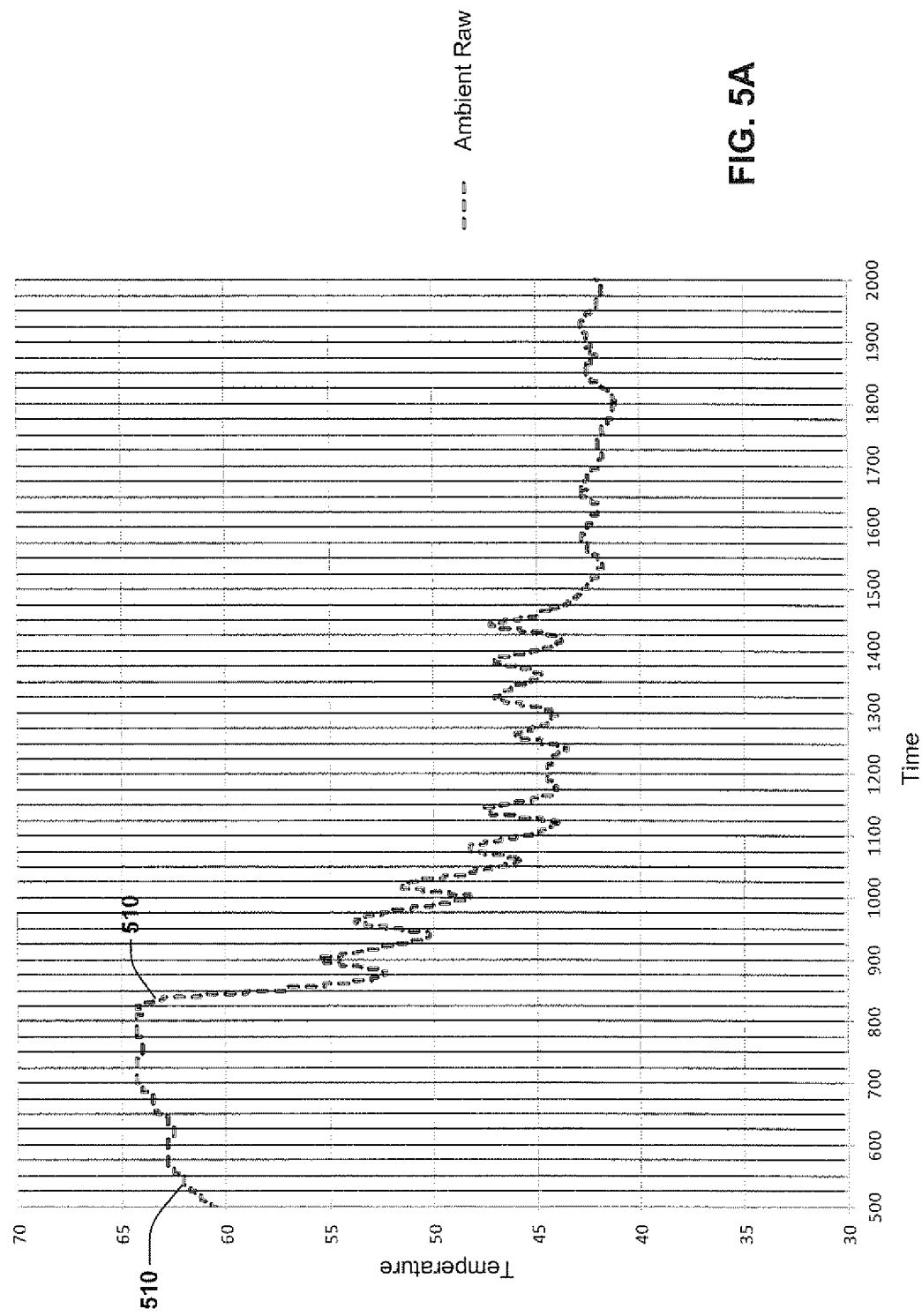

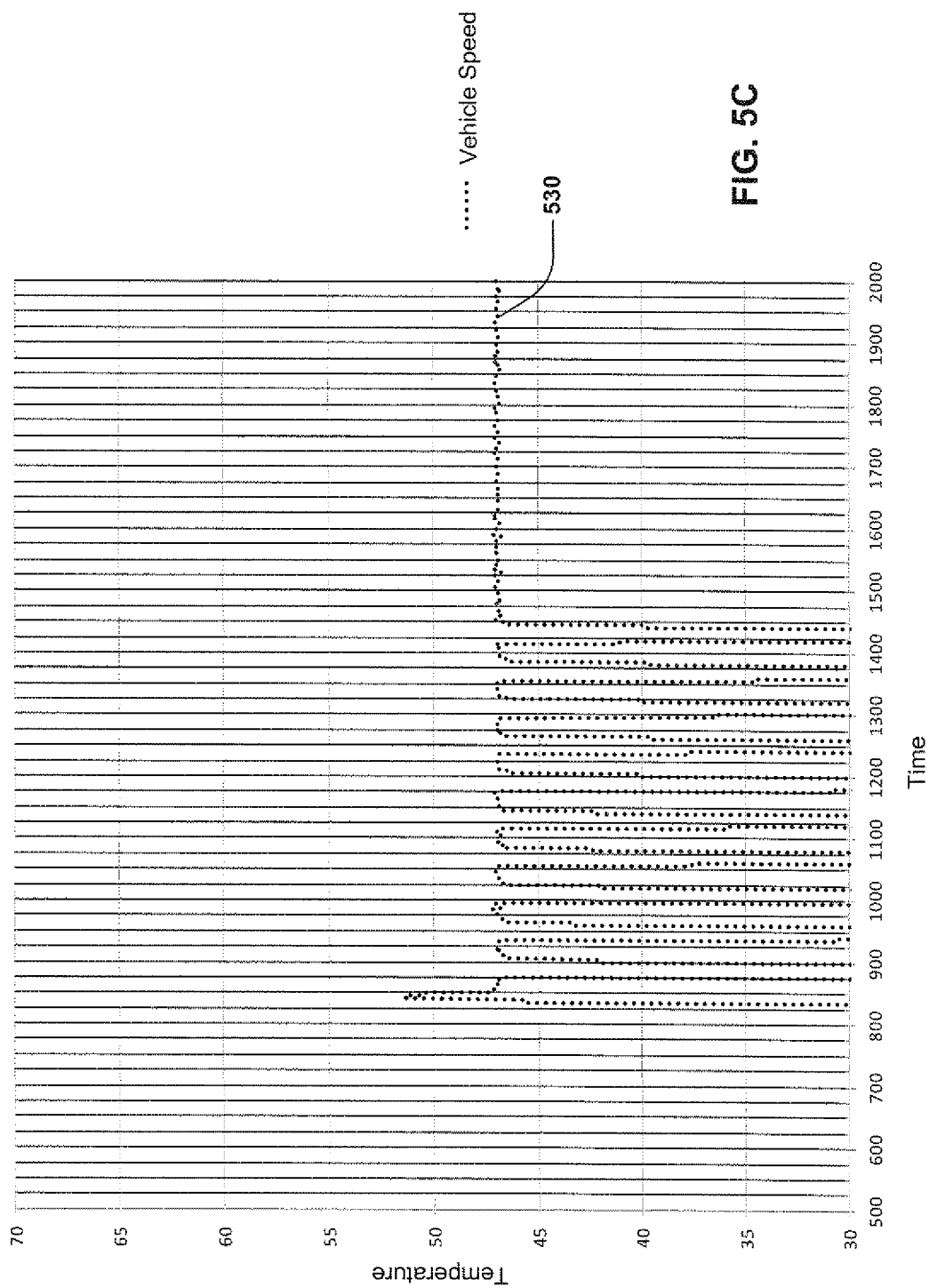

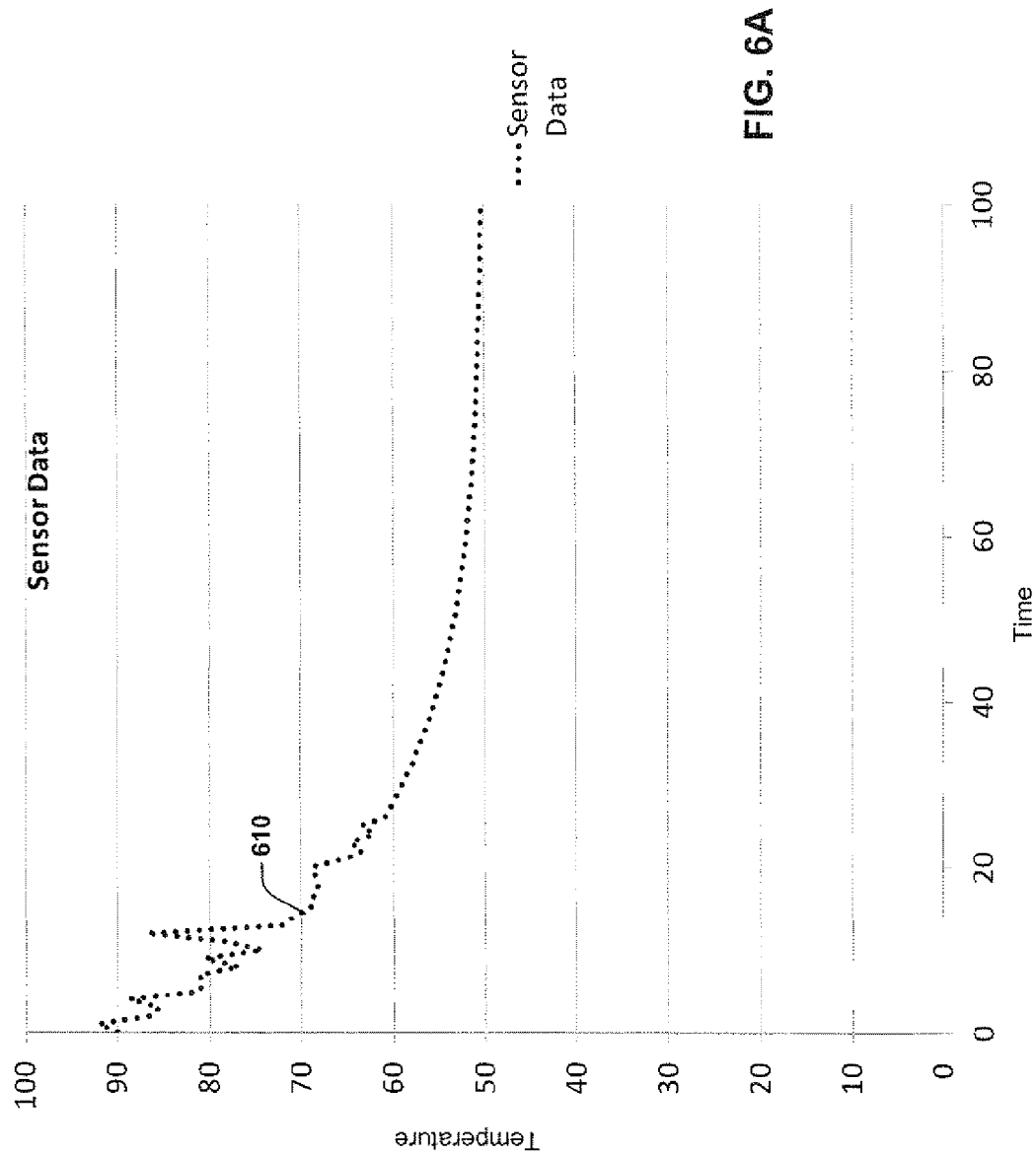

OUTSIDE AIR TEMPERATURE MEASUREMENT DEVICE AND METHOD

CROSS REFERENCE TO RELATED APPLICATIONS

This patent application claims priority to U.S. Provisional Application Ser. No. 61/781,978 filed Mar. 14, 2013, entitled OUTSIDE AIR TEMPERATURE MEASUREMENT DEVICE AND METHOD, which is incorporated herein by reference in its entirety.

FIELD OF THE INVENTION

The present invention is directed to an outside air temperature measurement device and method for particular use with vehicles.

BACKGROUND

The ability to measure the value of the Outside Air Temperature ("OAT") is a key process supporting the attainment of cabin comfort in heating ventilation and air conditioning ("HVAC") systems for vehicles that employ Automatic Temperature Control ("ATC") algorithms. Moreover, an accurate OAT value is required by several algorithms within the HVAC electronic control module other than the ATC algorithm, and finally, OAT is required by other electronic modules within the vehicle, such as the center stack temperature display module or modules that control such features like remote starting of the vehicle.

Due to the substantial thermal noise existing in the engine compartments of automobiles, where ambient temperature sensing devices are typically located for reasons of economy, the acquisition of a timely and accurate estimate of the outside ambient temperature is difficult to achieve once the vehicle has stopped moving for even a short period of time. Difficulty arises from the fact that the temperature sensor, which is usually a type of thermistor, measures not only the desired ambient air temperature component of temperature, but it also measures additional, undesirable "noise" components of engine-generated heat that build up as a result of a lack of air flow over and around the sensing device. In addition to heat being radiated directly from the engine, note that the vehicle's cooling fan is extracting engine heat from the radiator fins and this heat floods the engine compartment. There is no ram air present when a vehicle is stopped to exhaust that hot air. But once the vehicle acquires sufficient velocity, ram air from outside of the engine compartment flows over the sensor and cools it, resulting in a series of exponentially decreasing temperature measurements. In the current state of the art of OAT filtering processes, temperature measurement algorithms do not predict the final value of such a transient, decaying data series. Rather, currently implemented algorithms maintain the last known, trusted value of the OAT until environmental conditions such as vehicle speed, coolant temperature, and engine off time indicate that the sensor is likely to be purged of its thermal noise and is thought to be providing a near accurate representation of the ambient temperature. However, several minutes must expire once vehicle speed is adequate enough to flush the sensing element of retained thermal noise before a numerical convergence can begin to materialize between the last known, trusted value of ambient temperature and the currently reported ambient sensor value. During this time, lacking an accurate OAT temperature, the cabin of the vehicle can be uncomfortable with regard to temperature, freshness of the cabin air, and humidity content of the cabin air.

Techniques that use Newton's Law of Cooling to predict the final value of an exponentially decaying real-time data series from a thermally-monitored engine compartment have not been acceptably successful at deriving accurate numeric thermal model parameters. This failure is due to high-order noise factors that are impossible to characterize in these automotive thermal systems that significantly skew the sensor's data series elements away from an ideal exponential data series, resulting in unstable data predictions that appreciably undershoot or overshoot the true ambient temperature value. A practical characterization of these factors is aggravated by the thermal exponential model's time constant dependency upon vehicle speed.

Existing linear curve fitting and final value estimation approaches which might be employed via Newton's Law of Cooling are good at establishing model parameters from complete, existing data sets that may be available after the thermal transient response has completed, but are not so good at predicting the outcome of real-time data that is necessary to improve the cabin environment.

Also, due to the real-time requirement to predict the final value of the data series, and due to the temperature offset commonly found in exponential numerical models' data series, nonlinear curve fitting approaches must be applied. For example, the value of an exponential decaying numeric converges toward a constant value, which can be, but is not necessarily a value of zero. When the constant value is non-zero, it is often referred to as the "offset", or the "final value". But the sensitivity of exponential models to variations in data early in the exponential transient response makes effective use of nonlinear curve fitting approaches difficult, and sometimes incapable of attaining a solution. The solution often diverges rather than converges as the process proceeds due to the deviation of the data from the ideal exponential form.

Other approaches, such as the use of a Kalman filter, weighs predictions based upon model parameters against statistical deviations of the real time data to provide "statistically filtered" data. Such an approach also does not achieve a satisfactory solution to the problem. Because of the data skewing factors previously mentioned, the model required to establish statistical parameters cannot be known ahead of time, yet it is required in the Kalman filter method to correct the current data sample and predict the next. Additionally, the thermal data from the vehicle's environment is not skewed by statistically neutral noise exhibiting an average value of zero, as is required by Kalman filter method, but rather is skewed by thermal characteristics of the system that cannot be practically or economically obtained, and these noise factors generally have a positive bias.

SUMMARY OF THE INVENTION

A fast outside air temperature ("OAT") acquisition process, in accordance with the present invention, reduces the time of acquisition of an accurately determined OAT from minutes to seconds so that cabin comfort and response of temperature sensitive applications is achieved much sooner than with the use of currently employed control processes. The control process of the present invention departs from existing curve fitting approaches because it can determine in real time, rather than after the fact, an exponential mathematical model's characteristic parameters.

In accordance with an example embodiment of the present invention, an OAT measurement device and method derives a useable final value of the OAT within seconds of beginning of vehicle movement, even though positively-biased thermal noise is present in the system. Thus, for automatic temperature control systems, vehicle cabin comfort can be obtained much more quickly.

In accordance with one aspect of the present invention, the final value of the trend of a series of temperature data that exhibits a first order exponential decay is predicted in real time. This invention provides an early determination of a "true" ambient temperature from a sensor even though the sensor is saturated with substantial thermal noise energy from heat generation sources located near the sensor. The process predicts the final value of the exponential data series by developing a mathematical expression (i.e., model) for the exponential data series while being able to discriminate against the thermal noise components existing in the data.

Specifically, the method of the present invention generates three separate areas (i.e. integrals) that are associated with and calculated from the exponentially decaying data series. One of these represent the area under the data series with respect to time, the independent variable, another represents an area that relates the peak value to and the current value of the data series with respect to time, and a third represent a portion of the area bounded by a horizontal line parallel to the horizontal axis that intersects the current datum. The first two areas overlap along the boundary representing the exponential delay and are combined to create a scalar quantity labeled as a "gross" split. The term "gross area" simply implies a representative area that is crude at first, but undergoes a number of iterations as more elements of the data series are received and the area under the curve of the model is refined. Thus, this is a composite area that correlates much more closely to the ideal area found under the analytical exponential delay without the numeric error and positive noise bias that tends to accumulate when the numeric integration is performed alone. Therefore, the gross split tends to moderate the area variances that would occur if only the area under the data series were used, providing a sort of center of mass, and thereby serves to desensitize the computation of the magnitude of the transient response portion of the data series. This magnitude is referred to as the "StepSize".

Moreover, curve fitting of an exponential data series that exhibits a non-zero final value is difficult because both the StepSize of the transient response and the time constant of the exponential decay must both be estimated from the data series simultaneously (i.e., the non-zero final value, or offset, makes the problem nonlinear). Therefore, because both are unknown, a good initial guess must be made for one and/or the other parameter. Since the final value is quite sensitive to both parameters, an error in one parameter, by virtue of a bad guess, tends to degrade the estimation of the other parameter, or vice versa, and subsequently, the final value estimation suffers. However, the method of the current invention calculates an independent, early estimation of the time constant of the transient response, which is made possible by employing trigonometry to a few of the early data points, thereby eliminating the linearity problem of individual data points having embedded in them the component of the final value (i.e., offset), and also thereby improving the certainty of the initial guess of the time constant. If the time constant is accurately estimated, the accuracy of the StepSize and the subsequent estimation of the final value are greatly enhanced.

BRIEF DESCRIPTION OF THE DRAWINGS

FIGS. 4A-4H are individual graphical representations of the data shown in FIG. 4;

FIGS. 5A-5C are individual graphical representations of the data shown in FIG. 5;

FIGS. 6A-6C are individual graphical representations of the data shown in FIG. 6;

DETAILED DESCRIPTION

The present invention provides a device and method that develops a real-time adaptive exponential model that employs multiple data fitting techniques that together desensitize model parameter estimation due to noise effects. This is particularly useful in employing the exponential time constant to determine a StepSize temperature model parameter which is necessary for estimating the final value of the OAT.

The fundamental thermal model that represents the ambient temperature within a vehicle's engine compartment is represented by the exponential decay equation which exhibits an initial condition temperature and a temperature StepSize, as provided in equation 1:

$$PresentValue(t) = InitialValue - StepSize*(1-\exp(-t/\tau)) \qquad (EQ.\ 1)$$

where PresentValue, InitialValue and StepSize are temperatures, $\tau$ is the exponential time constant, and t represents the independent variable time.

Thermal systems in general exhibit both a transient temperature response and a steady state temperature response. The InitialValue is the numeric value at which the system begins its transient response at time t=0. The steady state response, as shown in equation 1a, is the "FinalValue", which is the numerical value that will be present after the transient response has decayed from the InitialValue to a point where the PresentValue at a later time t will always be the same temperature value. This happens at approximately time $t=5*\tau$. In other words, the FinalValue is the sought after temperature value at which the system is in equilibrium.

The StepSize is defined as the magnitude of the difference between the InitialValue and the Final Value, which can be represented by equation 1a:

$$\text{StepSize} = \text{InitialValue} - \text{FinalValue} \quad \text{(EQ. 1a)}$$

As an example, the engine compartment temperature can be 85 degrees Celsius, and the outside ambient temperature is 25 degrees Celsius. The expected value of the InitialValue would then be 85 C, and the expected FinalValue would be 25 degrees Celsius. Thus, implementing equation 1a yields a StepSize of 60 degrees Celsius.

In the algorithm described herein, both the StepSize and the FinalValue are unknowns, as well as the time constant, $\tau$. Thus, an estimate of the StepSize is first sought (i.e., the magnitude of the exponential decay). Once the StepSize is found, the FinalValue can be calculated by subtracting the StepSize from the InitialValue. Accordingly, the sought after quantity resulting from accurate model parameter estimation is the FinalValue, which can be represented by equation 1b:

$$\text{FinalValue} = \text{InitialValue} - \text{StepSize} \quad \text{(EQ. 1b)}$$

where FinalValue is the steady state outside air temperature (OAT) value after thermal noise and stored thermal energy has dissipated from the sensor environment, leaving only the true outside ambient air temperature.

Figure 1:
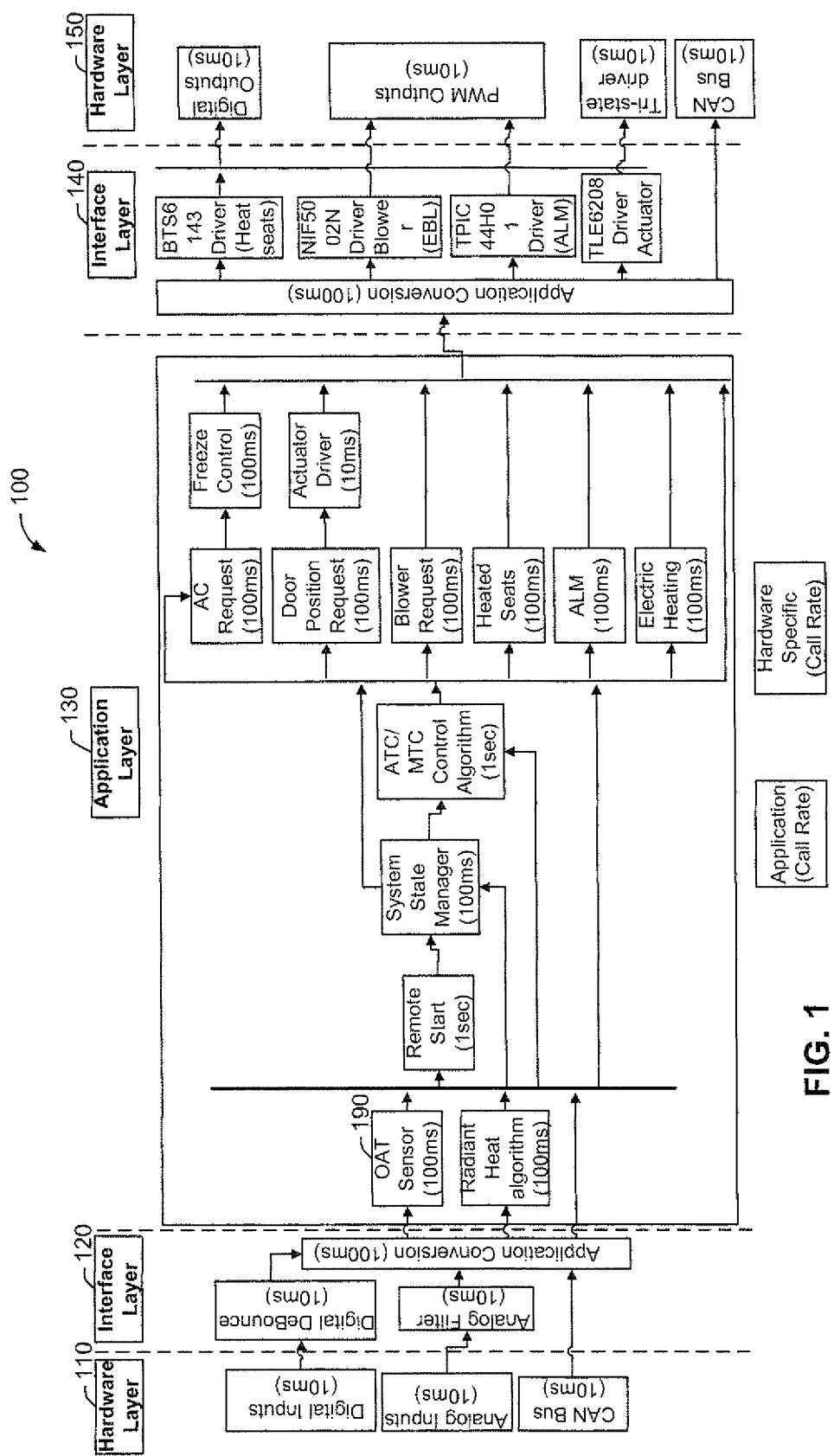
FIG. 1 is a schematic block diagram of the software algorithms within an HVAC electronic control system that embodies a means/device for measuring outside temperature in accordance with an example embodiment of the present invention.

FIG. 1 shows a schematic block diagram of device 100 for measuring outside temperature in accordance with an example embodiment of the present invention. Device 100 includes an application layer 130 to provide processing and algorithm capability, including OAT sensor 190. Application layer 130 is central between a first hardware layer 110 and a first interface layer 120, and a second interface layer 140 and a second hardware layer 150. The device and method of the present invention provides an accurate estimation of the final value of the exponential decay of an automobile thermal system regarding the OAT, and provides this estimation within seconds of vehicle movement, versus minutes of vehicle movement for conventional estimation processes. The device and method of the present invention provides significant improvement in HVAC system performance with regard to time-to-cabin-comfort, and improves the initial accuracy of automotive OAT displays, as well as improves the performance of any other vehicle system that depends upon early and accurate estimation of the OAT.

Figure 2:
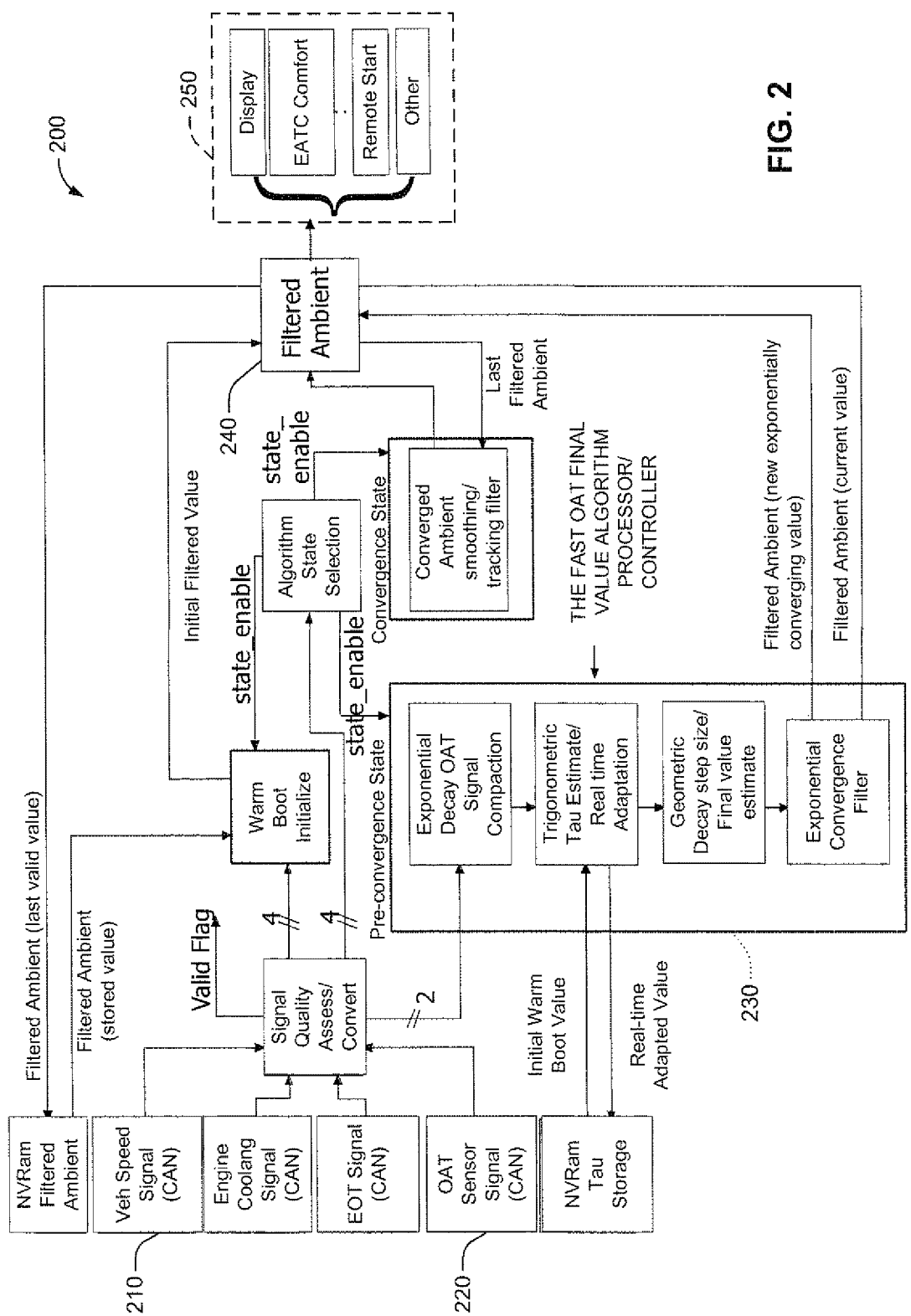
FIG. 2 is a schematic block diagram illustrating a control process in accordance with an example embodiment of the present invention.

FIG. 2 is a schematic block diagram 200 of a control process in accordance with an example embodiment of the present invention. Sensors 210 and 220 provide vehicle speed and outside air temperature, respectively. A fast OAT algorithm, as described by the present invention, is performed in the Pre-convergence state 230 to provide a final value estimation of exponential decay. The fast OAT algorithm would be performed in a microcontroller and/or processor which is connected to one or more sensors. Those skilled in the art would appreciate that the algorithm could also be performed using discrete circuitry or using an application specific integrated circuit (ASIC). Ambient filter 240 provides the final value estimation of exponential decay to vehicle system applications 250, such as display, remote start, etc.

Figure 3:
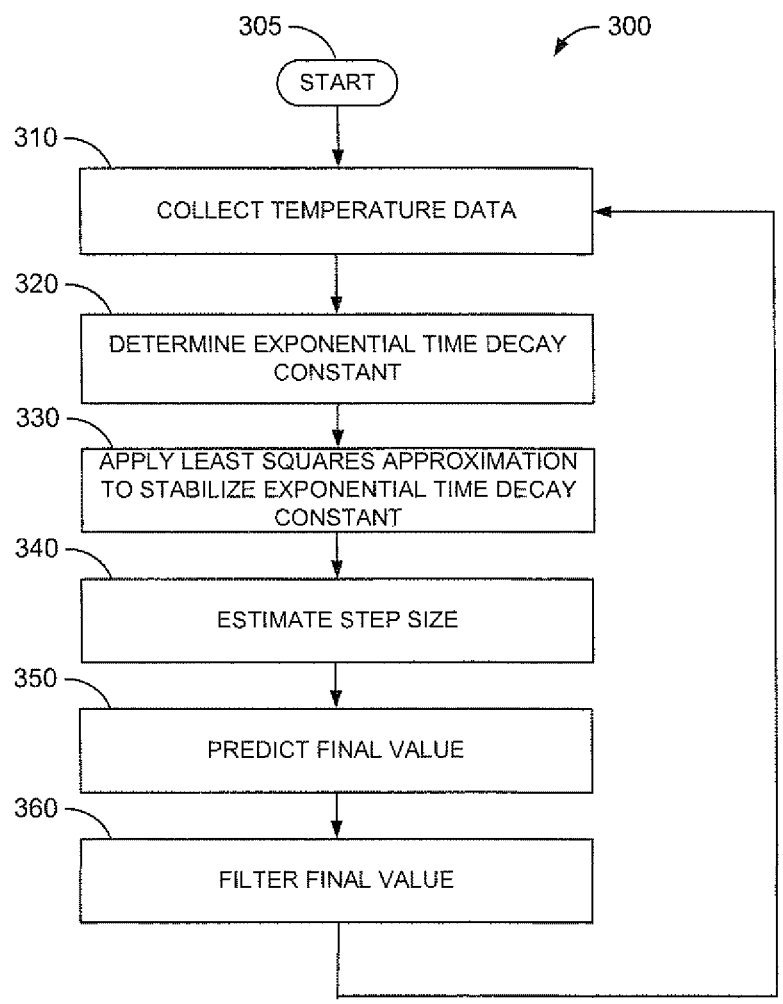
FIG. 3 is a flow chart showing the final value estimation of exponential decay process in accordance with an example embodiment of the present invention.

FIG. 3 is a flow chart illustrating an example method 300 implementation of the final value estimation of exponential decay in accordance with an example embodiment of the present invention. The process of the present invention determines $\tau$ and StepSize by means of curve fitting the mathematical model to the data collected in real time, and then determining the FinalValue from those parameters. The more quickly this is achieved as real time data is obtained, the more quickly the vehicle cabin environmental conditions are modified to result in driver and passengers comfort.

The method 300, in accordance with an example embodiment of the present invention, begins at the Start 305, where controllers are initiated, initial values are determined. The method then proceeds to 310 to begin collecting temperature data 310. As discussed herein, outside air temperature sensors are often located within the engine compartment. After collecting data in real time, the exponential time decay constant $\tau$ is determined 320. $\tau$ is determined by employing a series of calculations based on collected data. For example, a trigonometrically-based $\tau$ estimation can be made that removes the model dependency on the offset (i.e., the InitialValue minus the StepSize) from the curve fitting mathematics. Removing this dependency allows for a linearization of the exponential expression and therefore eliminates the need to iteratively curve fit an inherently non-linear function. An example method of calculating $\tau$ begins with analyzing the data, as shown in equation 2:

$$\theta_{t(k)} = \tan^{-1}((\text{data}_{t(k-1)} - \text{data}_{t(k)})/(t_{(k)} - t_{(k-1)})) \quad \text{(EQ. 2)}$$

where $\theta_{t(k)}$ is the angle formed between a line connecting two data points and a horizontal line, parallel to the independent variable axis, connecting the elapsed time between those two data points; $\text{data}_{(t)}$ and $\text{data}_{t(k-1)}$ are two data points taken from the collected sensor data series; and $t_{(k)}$ and $t_{(k-1)}$ are time values associated with respective data points. Once $\theta_{t(k)}$ is calculated, it is applied to equation 3:

$$\tau = -t_{(k)}/\ln(\theta_{t(k)}/\theta_0) \quad \text{(EQ. 3)}$$

where $\tau$ is the time constant of the exponential decay; $t_{(k)}$ is the time value since time zero at the beginning of the exponential decay; $\theta_{t(k)}$ is the computed angle at $t_{(k)}$ from equation 2; and $\theta_0$ is an initial angle estimate. In other words, equation 3 results from equation 2 being applied to the initial value and a first data point from the data series. $\tau$ can also be estimated from a table of $\delta$ temperature data versus $\theta$ pairs, depending on the particular application. Table temperature data can include empirical results acquired during experimental testing. In this respect, a broad sample of vehicle data acquired experimentally and listed as example values can serve as a look up table, thereby simplifying and expediting the processing of available data.

Such an approach is advantageous, as the trigonometric calculation is tolerant of variations in the data that would otherwise skew the value of $\tau$ iteratively used in the non-linear approach. The nonlinear approach also lends itself to unreliable and potentially unstable results in the absence of an accurate initial guess for either or both $\tau$ and StepSize. In order to calculate an accurate FinalValue, numeric stability is critical in the early stages of the exponential decay, while not so critical is the absolute accuracy of $\tau$, especially given the practical range of initial values and settling times typical for vehicle thermal systems. In other words, a moderately wide range of possible values for the initial angle estimate (which is derived from a potentially noisy data series) yields a suitable estimate of $\tau$. Moreover, the estimates of $\tau$ can be refined as the data series progresses.

In accordance with other embodiments of the present invention, alternative methods for the estimation of $\tau$ are also provided. Alternative methods may be useful depending on the particular application, including processing capability, design requirements, and other practical considerations. A first example alternative is provided in equation 3a:

$$\tau = -t_{(k)}/((\ln(\text{data}_{t(k)} - \text{weightOffset} - \text{data}_0 + \text{StepSize})/\text{StepSize}) \quad \text{(EQ. 3a)}$$

where the weightOffset is introduced to favor data elements that appear to be skewed lower than the model is trending. It is noted that equation 3a is an iterative calculation. In other words, a good estimate of StepSize is required to achieve a suitable value of $\tau$. A second alternative is provided in equation 3b:

$$\tau = (t_{(k)} - t_{(k/2)}) / \ln((data_0 - data_{t(k/2)})/(data_{t(k/2)} - data_{t(k)})) \quad \text{(EQ. 3b)}$$

The value of $\tau$ may also be determined empirically by testing and calibration of any particular vehicle design.

Once calculated, $\tau$ is averaged over successive driving instances, so that $\tau$ versus vehicle speed is adaptively characterized over the life of the vehicle. The equation that relates speed to $\tau$ is then used as a moderator on future initial computations of $\tau$ for a given driving instance. The value of $\tau$ is then further stabilized 320 by a least squares approximation of its actual value as data is received in real time during a driving instance. Once an estimate of $\tau$ is achieved, $\tau$ is then used to estimate 340 StepSize, which is a necessary model parameter used for final temperature value estimation.

A geometrically-oriented calculation (i.e., an integration of the exponential decay progression) is applied to compute the StepSize of the exponential model. For example, by using selected integrals associated with the fundamental model, and by performing the corresponding numerical integration procedures on the sensor data series, a StepSize calculation is performed.

The numeric integral under the real-time exponential decay data series ("exponential data area" (EDA)) is computed, as provided in equation 4:

$$EDA_{t(k)} = \Sigma_{n=1 \text{ to } k}(data_{t(n)} + (t_{(n)} - t_{(n-1)}) + ((data_{(n-1)} - data_{t(n)}) * (t_{(n)} - t_{(n-1)}))/2) \quad \text{(EQ. 4)}$$

Then, an area referred to as "gross data area" (GDA), which is the product of the difference between the current data point and the Initial Value times the elapsed time at the current data point is computed according to equation 5:

$$GDA_{t(k)} = (data_0 - data_{t(k)}) * t_{(k)} \quad \text{(EQ. 5)}$$

Combining the results from equation 4 and equation 5, a quantity referred to as "gross data split" (GDS) can be computed by taking the difference between the two integration values, dividing the difference by two, and adding it to the gross data area, as shown in equation 6:

$$GDS_{t(k)} = ((EDA_{t(k)} - GDA_{t(k)})/2) + GDA_{t(k)} \quad \text{(EQ. 6)}$$

When the gross data split and the gross model split are compared as the data series progresses, they form two lines that substantially overlap, and the congruence of the lines is an indication of the quality of the model parameter fit. Although this congruence check is not necessary to perform during the estimation process, it could be used as either a separate or complimentary means to adjust the StepSize estimation, as well as the estimation of $\tau$. However, the calculations and methods to estimate $\tau$ are employed to assure a good estimate. Equation 7, derived from a re-arrangement of the GDS, provides the estimation of StepSize:

$$StepSize_{t(k)} = ((data_0 * t_{(k)}) - (2*GDS_{t(k)})) / ((\tau * \exp(-t_{(k)}/\tau) - \tau + (t_{(k)} * \exp(-t_{(k)}/\tau)))) \quad \text{(EQ. 7)}$$

Further, a least squares approximation of StepSize$_{t(k), k=0 \text{ to } N}$ is calculated repeatedly as data is received in real time and the subsequent values of StepSize$_{t(k), k=0 \text{ to } N}$ are included in this least squares approximation of the (ideally straight-lined) FinalValue$_{t(k), k=0 \text{ to } N}$.

Figure 4:
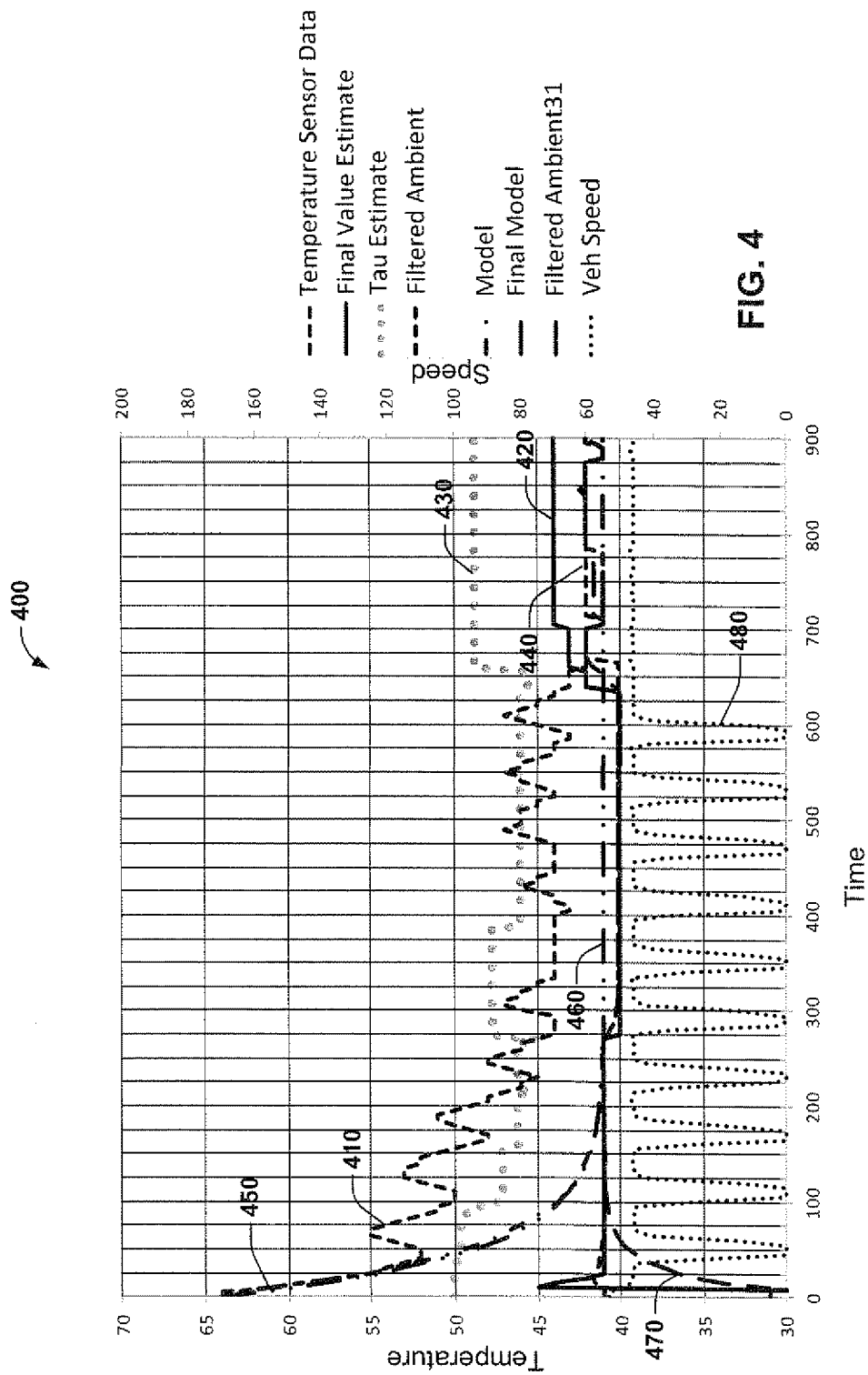
FIG. 4 is a graphical representation of data plotted from the output of a simulation of the algorithm in accordance with an example embodiment of the present invention.
Figure 4A:
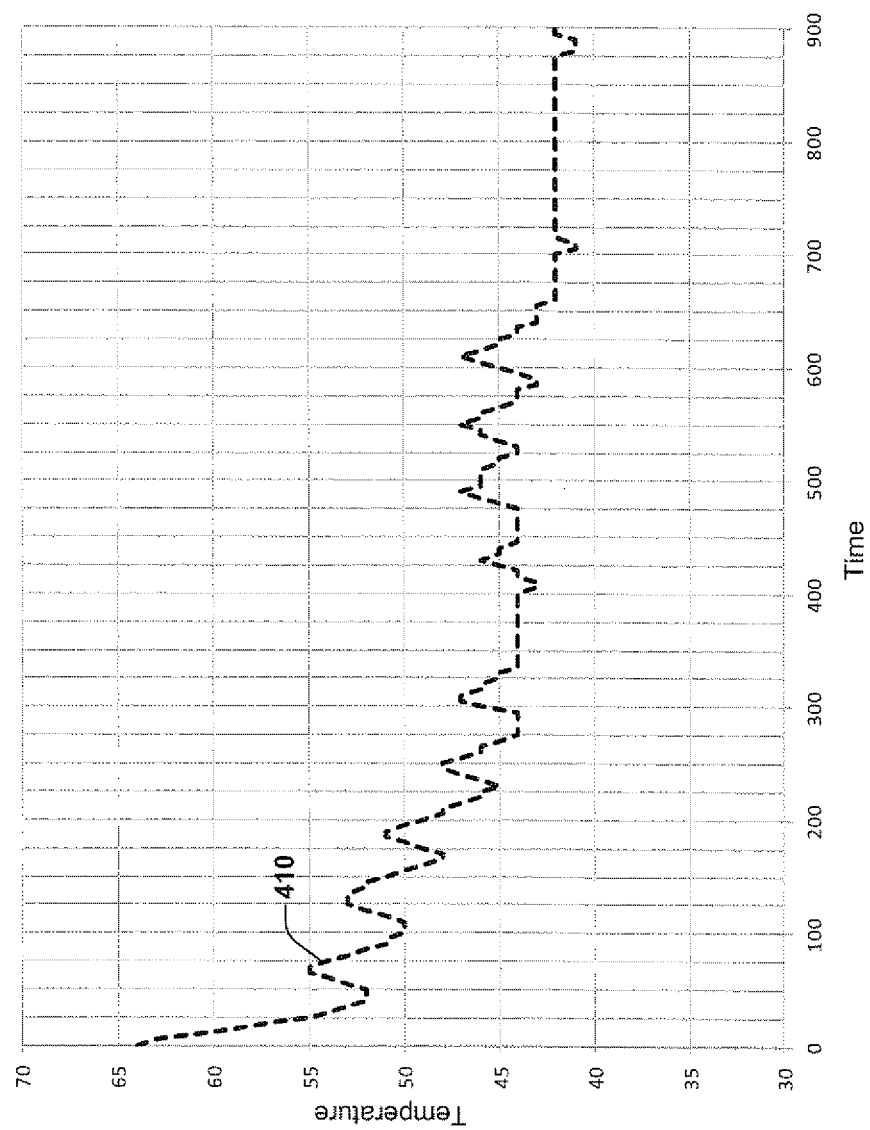
Figure 4B:
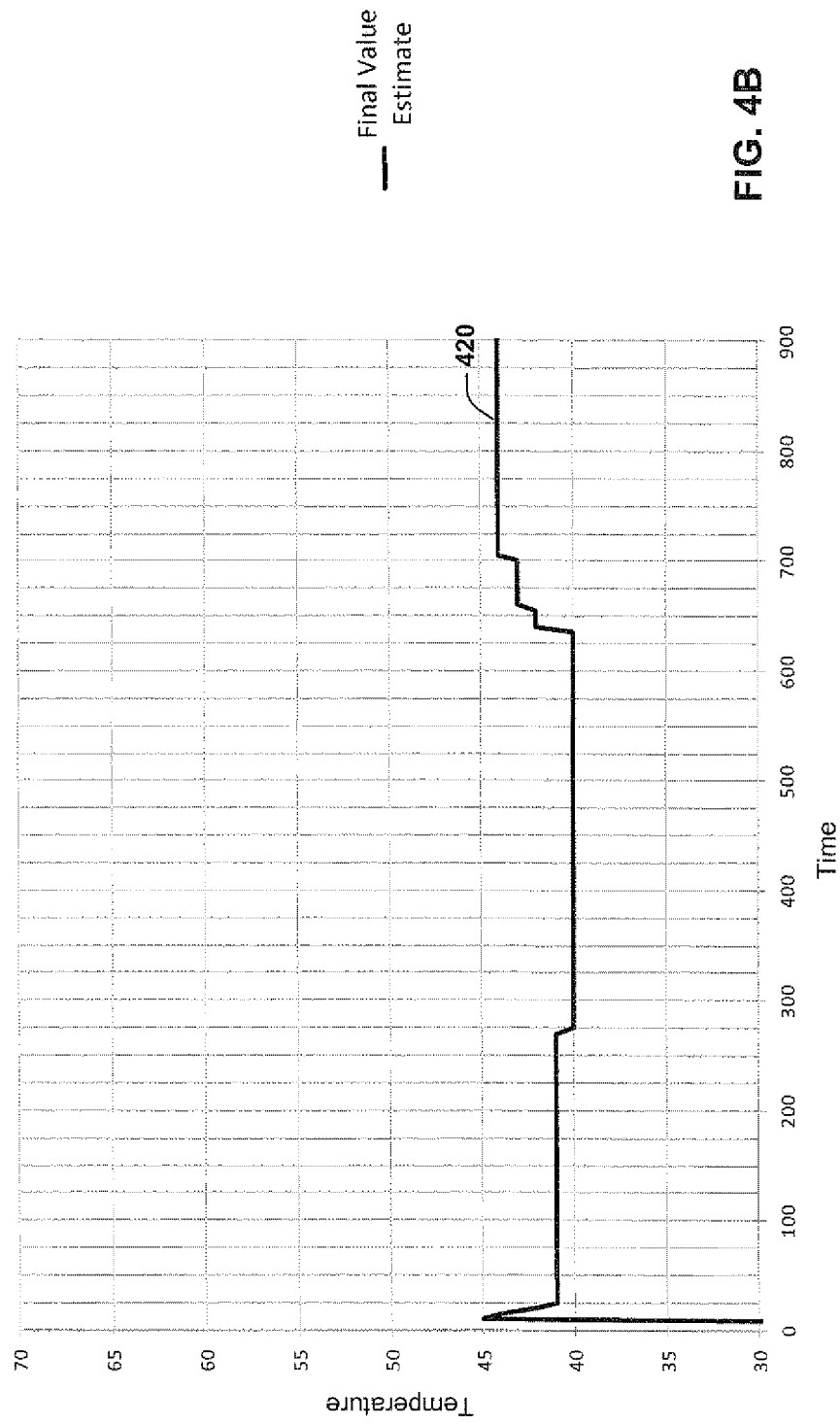
Figure 4C:
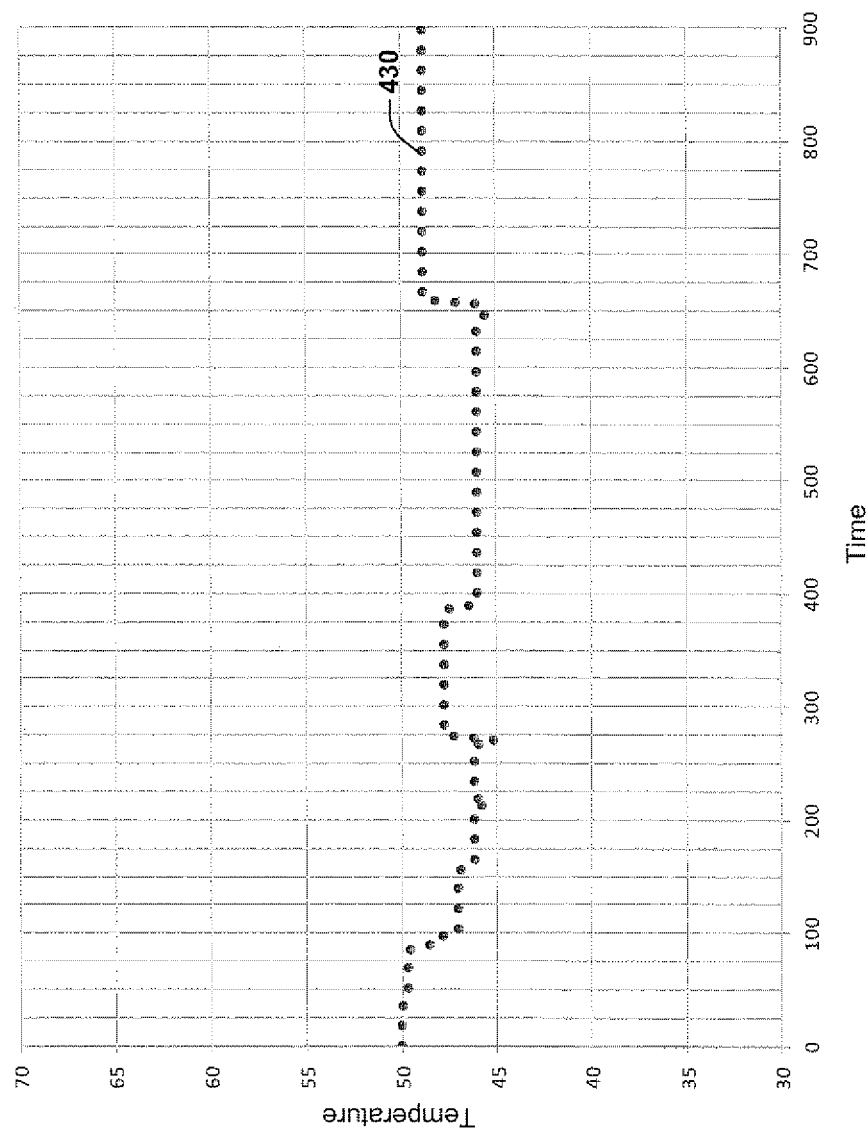
Figure 4E:
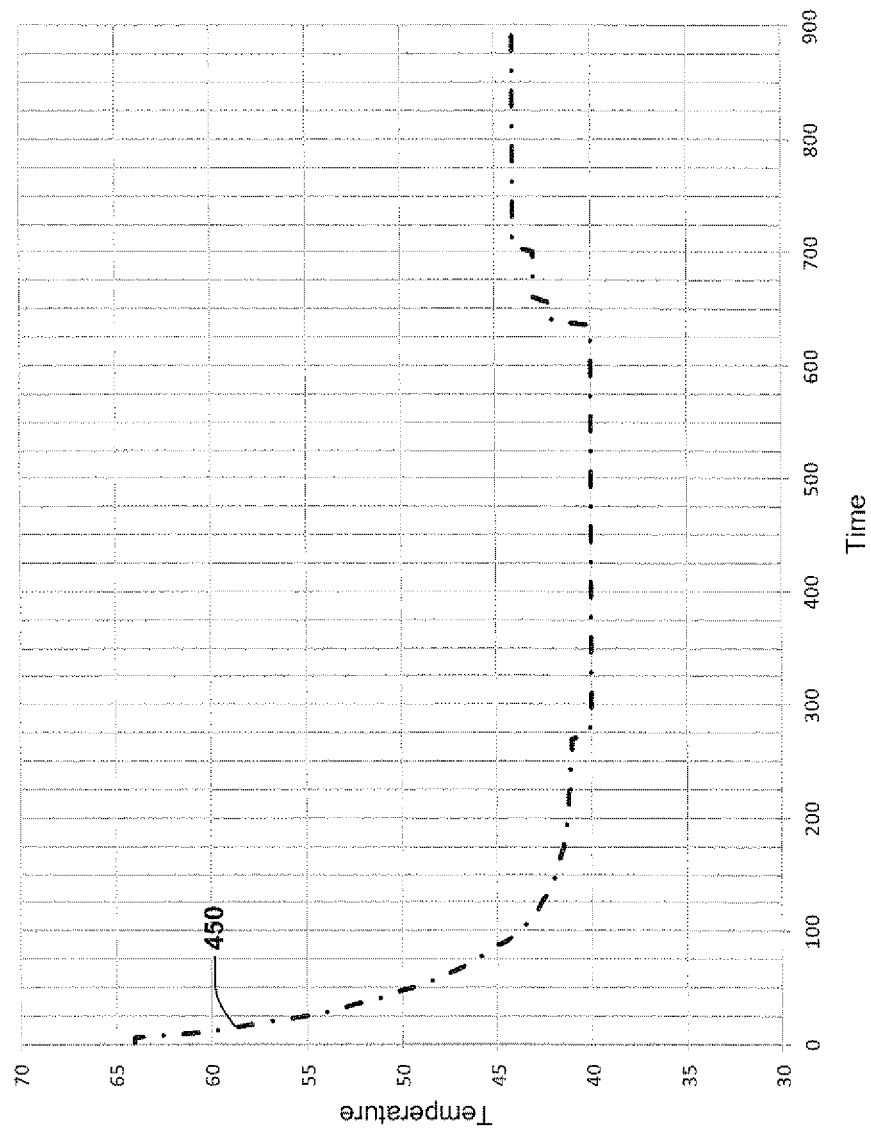

In the example of a moving vehicle experiencing driving conditions representative of repeated stop and go driving, the data series has a pronounced "shark's tooth" or "saw tooth" geometric character, as illustrated in FIGS. 4A and 5A. This is due to the acquisition of rising temperature values in the thermal environment when the vehicle reduces to very slow speed or stops, and the loss of those values when the vehicle regains speed (see FIGS. 4H and 5F). Such is typically the case in city driving versus driving in highway conditions. It is often difficult to apply established curve fitting techniques to this type of raw data, so the process of the present invention performs data compaction. In this manner, rising values of temperature are discarded during this type of driving, yielding a well-behaved exponentially decaying waveform.

By employing the above techniques and data, the desired final value of the decay (the "true OAT" estimate) is predicted 350 by subtracting the StepSize from the InitialValue. The final value is then filtered 360 to provide an accurate reporting value. In an application of the algorithm, a reported value (i.e., the algorithm output) is the result of exponential filtering that smoothes the transition between the last known reported value (i.e., the originally reported OAT at the time the vehicle was initially stopped and data was collected) and the final, steady state value of the algorithm. As the process is iterative, the method loops from the filtered final value 360 to temperature data collection 310 to develop and refine the reporting value.

FIG. 4 illustrates a graphical representation 400 of data plotted from the output of a simulation of the fast OAT algorithm as described herein. The sensor data 410 is of a temperature measured in degrees Celsius against time in seconds. The graph 400 shows the relation of different plotted information as described herein, including: Temperature Sensor Data 410; FinalValue Estimate 420; Tau ($\tau$) Estimate 430; FilteredAmbient 440; Model 450; Final Model Output 460; FilteredAmbient31 470; and Vehicle Speed 480 (measured in kilometers per hour kph). FIGS. 4A-4H illustrate individual graphical representations of the data provided in FIG. 4.

Additionally, The FilteredAmbient 440 is based upon an initial filtered value provided in the vehicle data, which is shown as 41 degrees Celsius in FIGS. 4 and 4D. The initial value that is stored does not necessarily correlate to the currently arrived at final value. This is due to the true ambient stored in the vehicle might have been stored under different environmental conditions. Final Model Output 460 uses the model parameters that have been computed when the temperature sensor data and final value first converge. The Final Model Output 460 represents the best set of model parameters that were found during the process. It is the ideal exponential response that fits all the available data. FilteredAmbient31 470 is the filtered ambient temperature if the initial temperature stored in the vehicle's memory were 31 degrees Celsius, as shown in FIGS. 4 and 4G. The filtered ambient usually begins with the value stored from the last time the vehicle was running, and thus is develops as the vehicle moves. Note that the response time is in seconds versus minutes (approximately 25 seconds before convergence). Also, note that there is virtually no overshoot.

Figure 5:
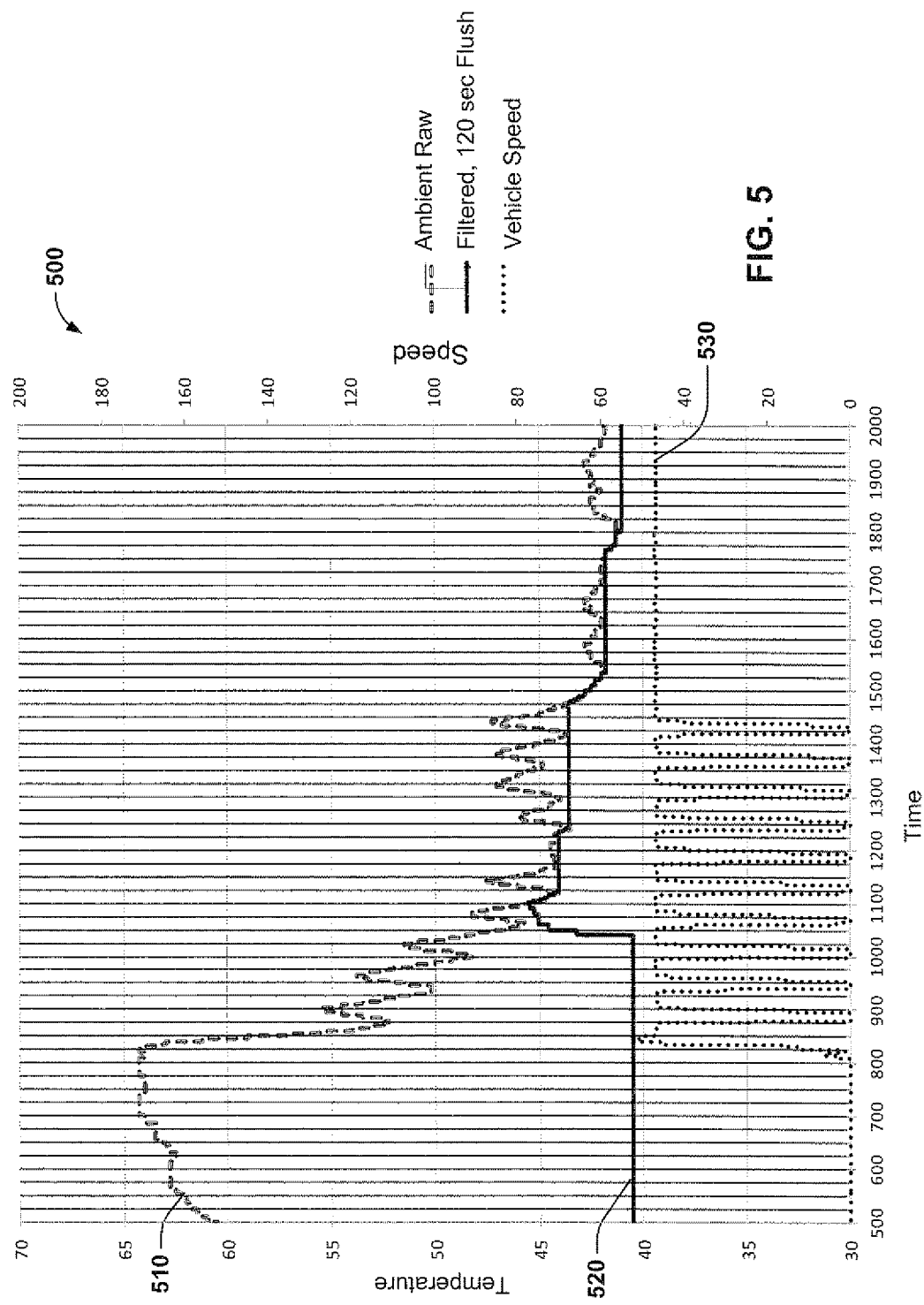
FIG. 5 is a graphical representation of data plotted from the output of a simulation of a conventional algorithm.
Figure 5B:
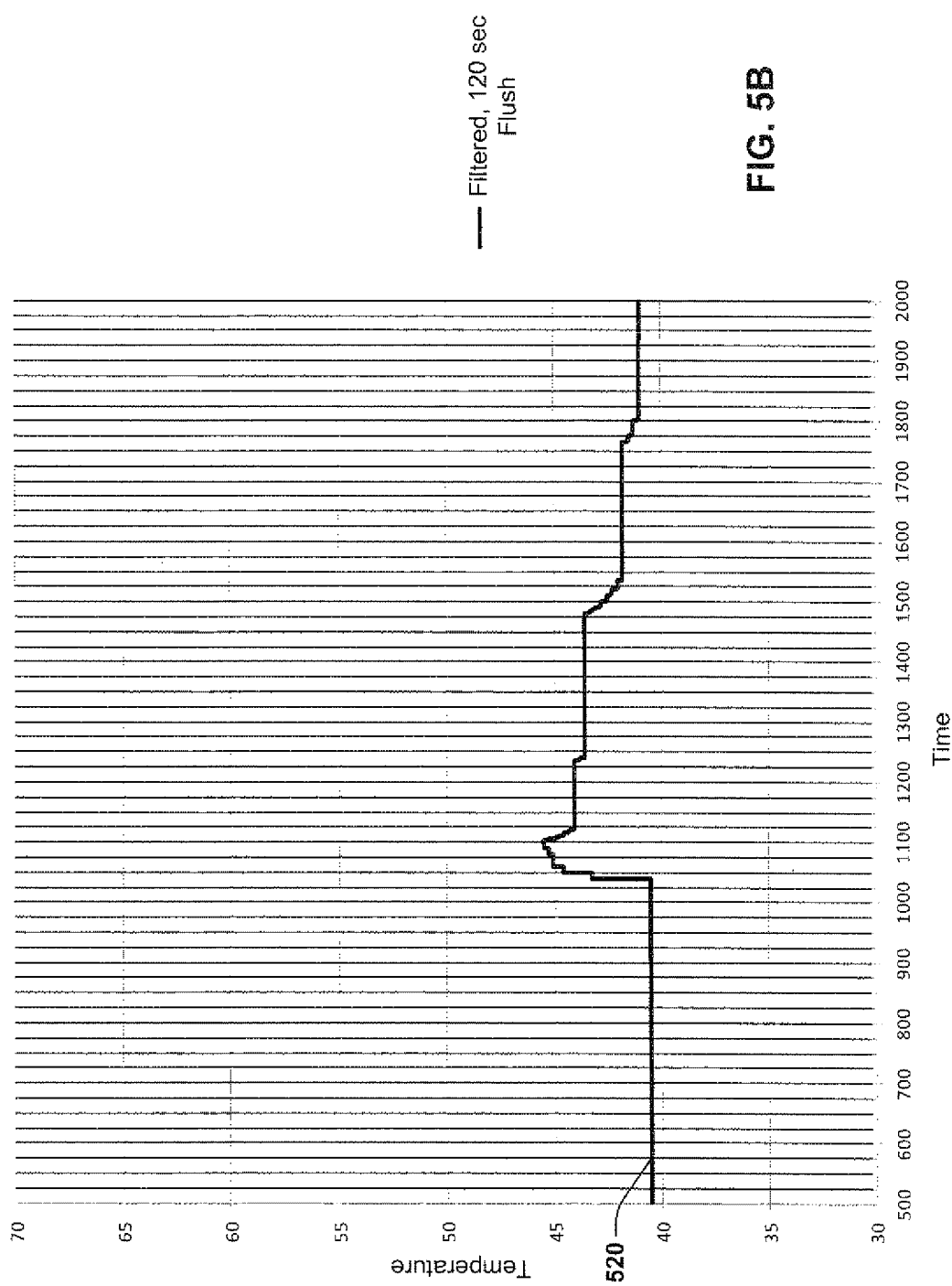

FIG. 5 illustrates a graphical representation 500 of data plotted from the output of a simulation of a conventional algorithm. The graph 500 shows the relation of different plotted information as described herein, including: Ambient Raw (i.e., collected temperature data) 510; Filtered, 120 sec flush 520; and Vehicle Speed 530. FIGS. 5A-5C illustrate individual graphical representations of the data provided in FIG. 5. Note that the response time approaches four minutes for the conventional approach, with approximately six degrees of overshoot.

Figure 6:
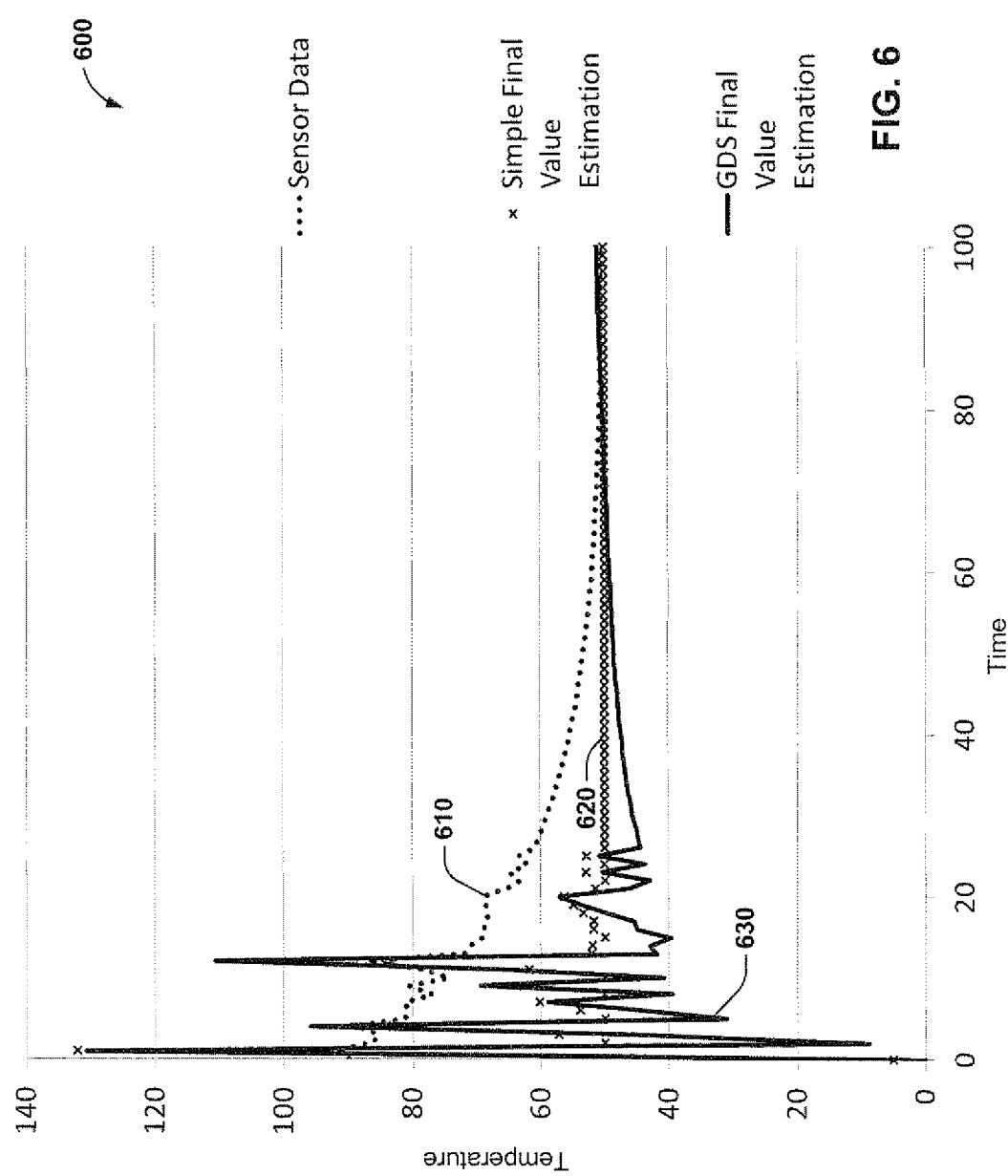
FIG. 6 is a graphical representations of data plotted from the output of a simulation with positively-biased noise embedded in the data.

FIG. 6 is a graphical representation 600 of sensor data 610 plotted from the output of a simulation of the invention that illustrates a geometric center, or "centroid", concept introduced by the mathematical area computation that lead to the determination of the StepSize and Final Value. The process uses the sum of the squared, point-by-point vertical component distances from the horizontally oriented (and constant-valued) Final Value. This geometric center minimizes the sum of squared Euclidean distances between itself and each point in the set. As shown in FIG. 6, arriving at an accurate Final Value requires multiple iterations due to the noise in the system. The centroid is defined as the geometric center of the line connecting each of the FinalValue$_{(k)}$ data points. Thus, the "horizontal" component of the geometric center of the Simple Final Value 620 estimation is notably above the true Final Value 630 of 50 degrees Celsius and will never converge to 50 degrees Celsius, whereas the horizontal component of the GDS Final Value Estimation is at approximately 50 degrees Celsius within a few iterations of collecting data samples.

Figure 6B:
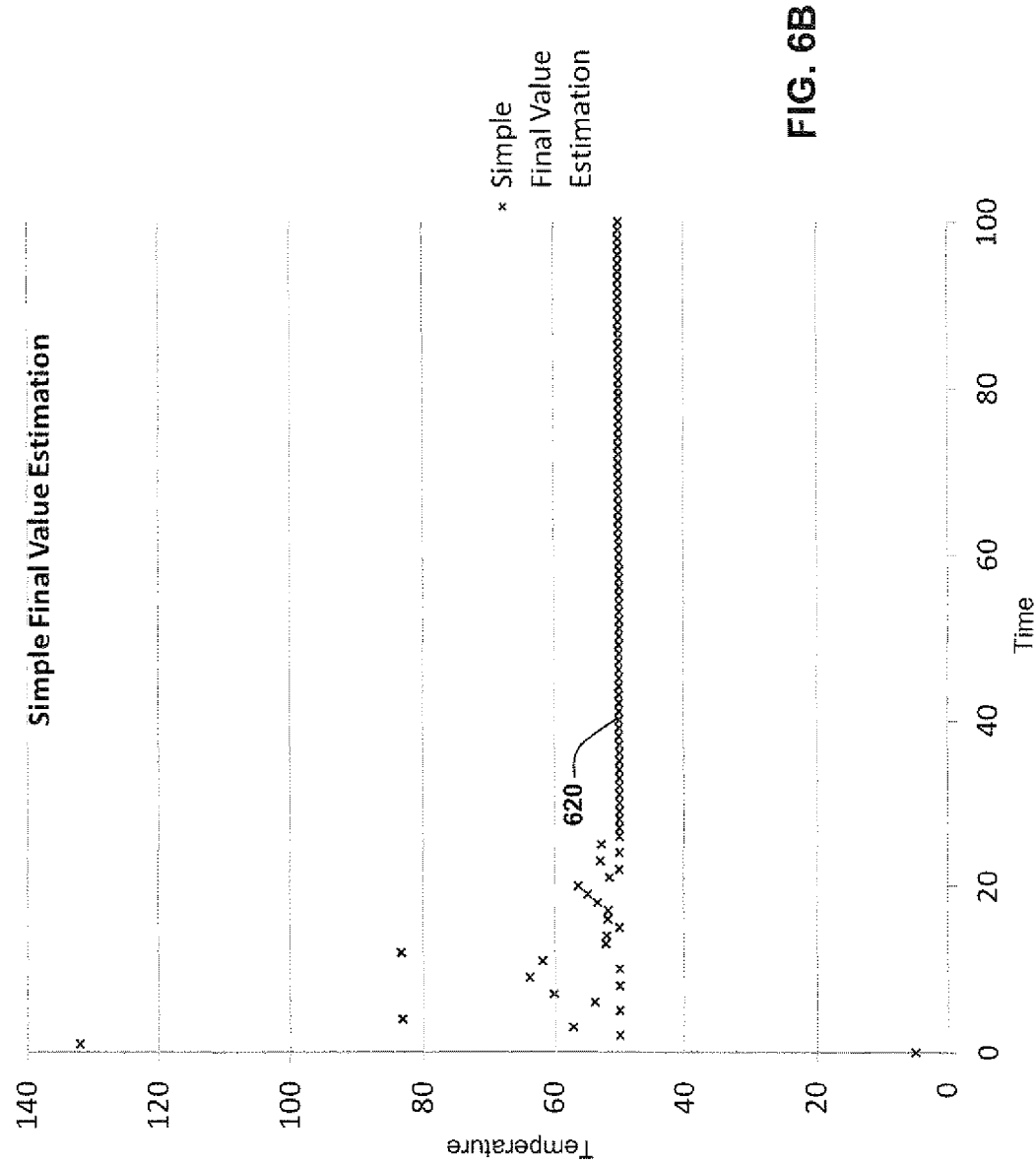
Figure 6C:
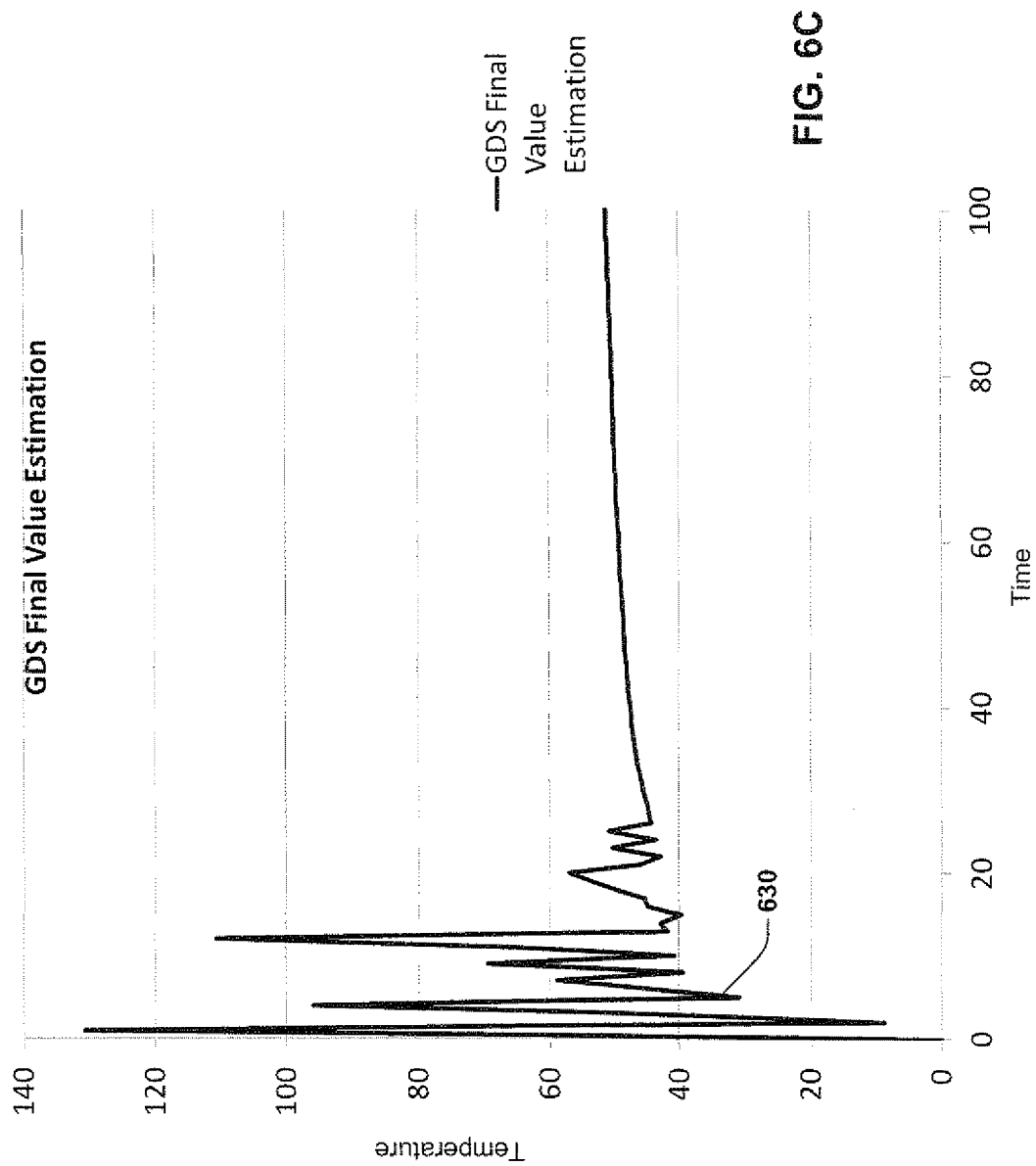

FIG. 6 shows a comparison of numerically unstable estimates of Simple FinalValue$_{t(k)}$ 620 with numerically unstable estimates of GDS FinalValue$_{t(k)}$ 630. Note that the values of 620 and 630 exhibit a horizontal center balanced around the true FinalValue. This is due to the GDS's reduction of the weight of GDA when the weight of EDA increases due to a positive noise component in the Sensor Data 610, which is based upon the EDA and GDA alone, produces a result skewed only in the positive direction from the true final value, and can never converge to the true Final Value. This illustrates the advantage provided by the incorporation of the GDS in this novel process designed to desensitize noise. The result can be further refined by limiting FinalValue$_{t(k)}$ to a value not greater than data$_{t(k)}$, the effect of which may somewhat degrade the accuracy of a particular FinalValue$_{t(k)}$ but will in turn improve the result of the moving average filtering that is subsequently applied to each FinalValue$_{t(k)}$. FIGS. 6A-6C illustrate individual graphical representations of the data provided in FIG. 6.

Figure 7:
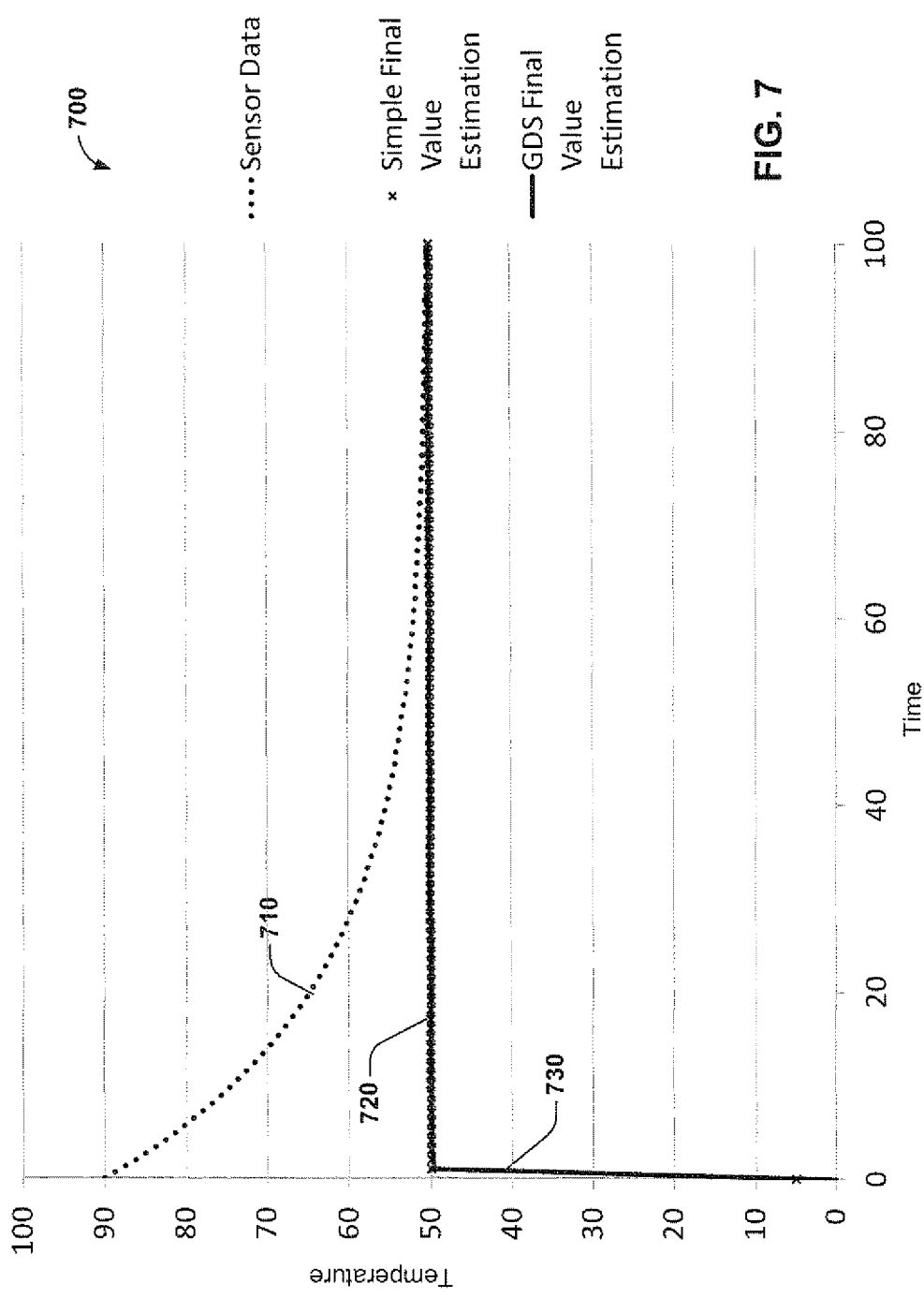
FIG. 7 is a graphical representations of data plotted from the output of a simulation without having the noise embedded in the data.
Figure 7A:
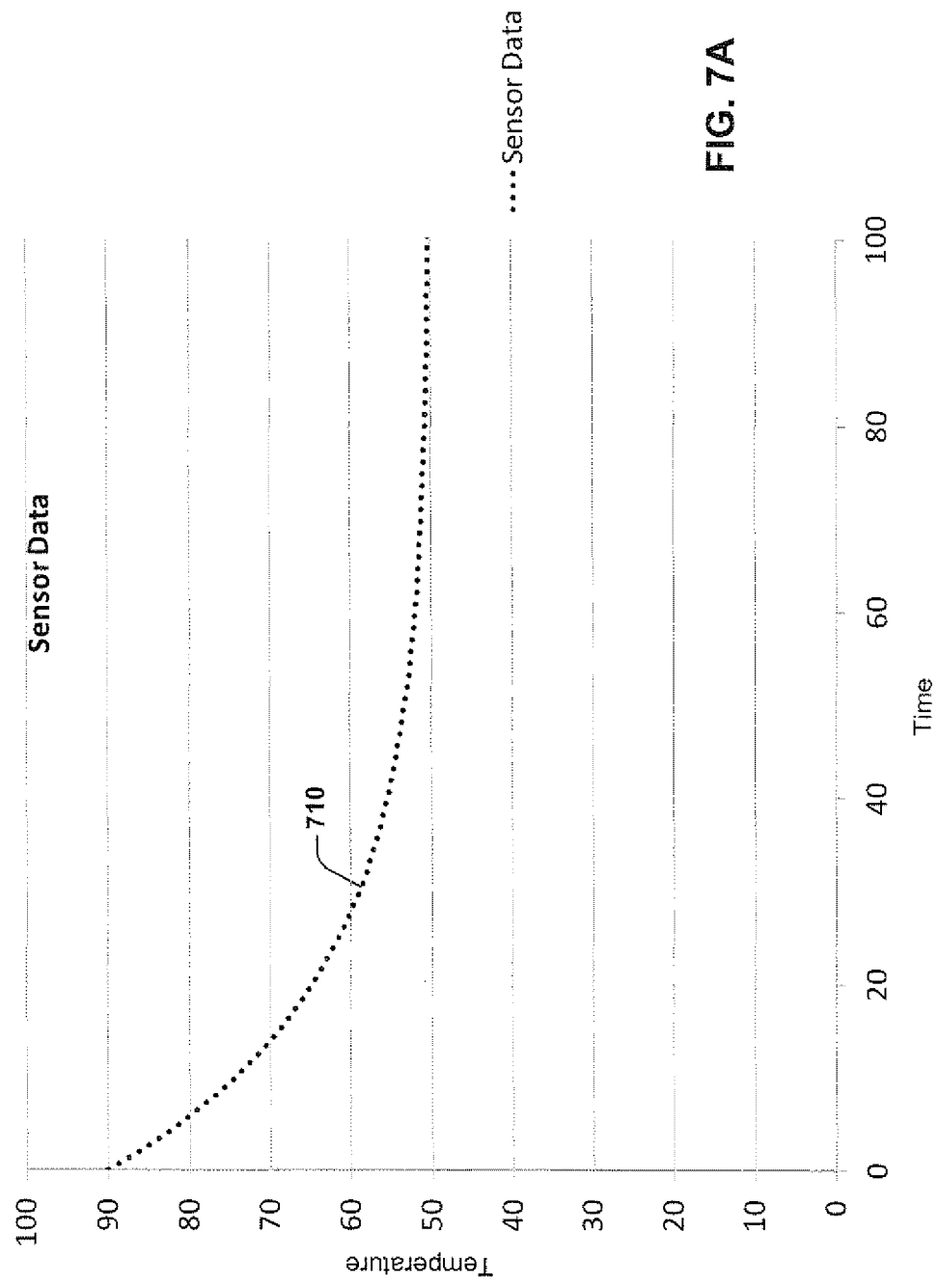
FIGS. 7A-7C are individual graphical representations of the data shown in FIG. 7.
Figure 7B:
Figure 7C:
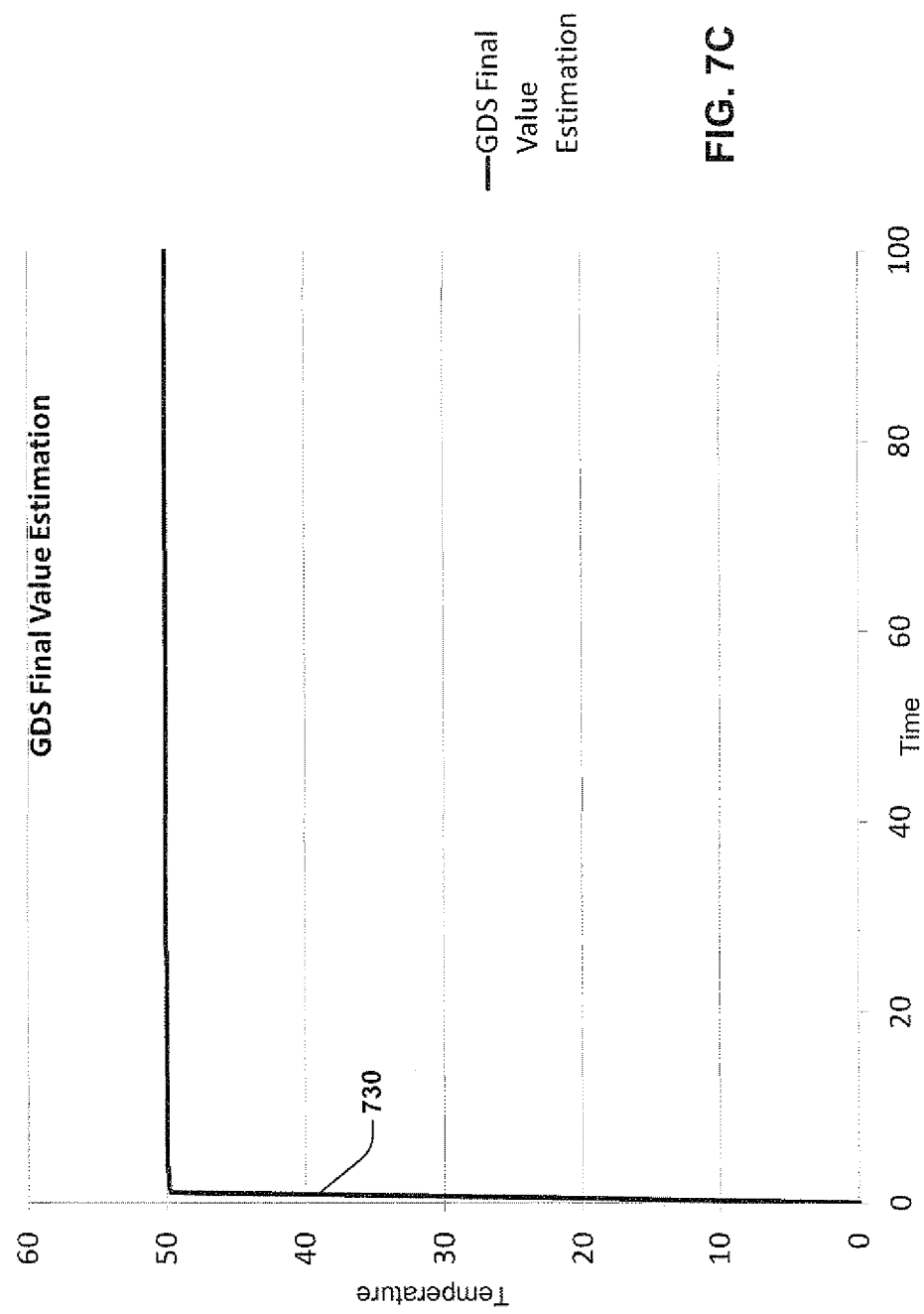

FIG. 7 is a graphical representation of the same data exhibited in FIG. 6, but without the noise component embedded in the exponential decay. Sensor data is represented by 710. The Simple Final Value Estimation 720, and the GDS Final Value Estimation 730, both illustrate that the horizontally-oriented "center" is congruent with the FinalValue. Thus, the graph exhibits that the positive-biased noise is neutralized using the GDS integration process. Moreover, FIGS. 7A-7C illustrate individual graphical representations of the data provided in FIG. 7.

Figure 8:
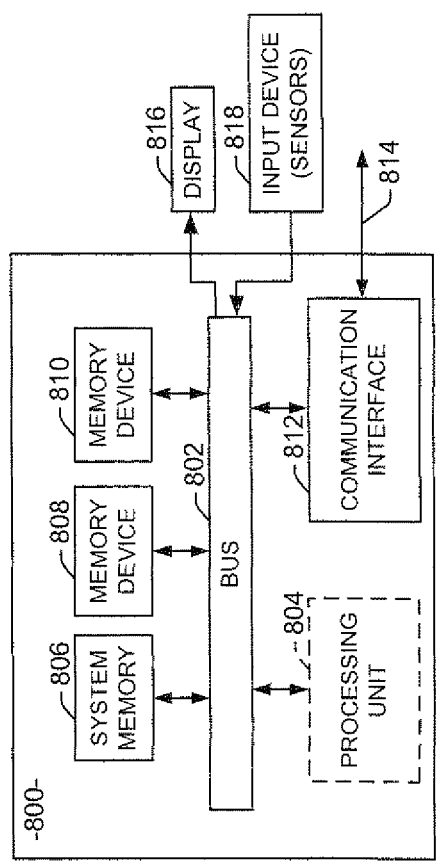
FIG. 8 processor upon which the instructions can be performed.

FIG. 8 is a schematic block diagram illustrating an exemplary system 600 of components capable of implementing examples of the present invention disclosed in FIGS. 1-4, such as the interactive overlay system illustrated in FIG. 1. The system 800 can include various systems and subsystems. The system 800 can be, for example, a computer system, an appliance, an application-specific integrated circuit (ASIC), a server, a server blade center, a server farm, or a similar device.

The system 800 can include a system bus 802, a processing unit 804, a system memory 806, memory devices 808 and 810, a communication interface 812 (e.g., a network interface), a communication link 814, a display 816 (e.g., a video screen), and one or more input devices 818 (e.g., the vehicle speed sensor 210 and the temperature sensor 220 of FIG. 2, a keyboard and/or a mouse, etc.). The system bus 802 can be in communication with the processing unit 804 and the system memory 806. The additional memory devices 808 and 810, such as a hard disk drive, server, stand alone database, or other non-volatile memory, can also be in communication with the system bus 802. The system bus 802 interconnects the processing unit 804, the memory devices 806-810, the communication interface 812, the display 816, and the input device 818. In some examples, the system bus 802 also interconnects an additional port (not shown), such as a universal serial bus (USB) port. The processing unit 804 can be a computing device connected to the one or more input devices 818 to perform the functions of the measurement device described herein, and can include an application-specific integrated circuit (ASIC). The processing unit 804, shown in a dotted outline, is configured to execute a set of instructions to implement the operations of examples disclosed herein. The processing unit 804 is The processing unit 804 can include a processing core.

The additional memory devices 806, 808 and 810 can store data, programs, instructions, database queries in text or compiled form, and any other information that can be needed to operate a computer. The memories 806, 808 and 810 can be implemented as non-transitory computer-readable media (integrated or removable) such as a memory card, disk drive, compact disk (CD), or server accessible over a network. In certain examples, the memories 806, 808 and 810 can store text, images, video, and/or audio, along with appropriate instructions to make the stored data available at an associated display 816 in a human comprehensible form. Additionally, the memory devices 808 and 810 can serve as databases or data storage for the system illustrated in FIGS. 1 and 2. Additionally or alternatively, the system 800 can access an external data source through the communication interface 812, which can communicate with the system bus 802 and the communication link 814.

In operation, the system 800 can be used to implement a control system for a system that governs the interaction between any sensors and associated applications. Computer executable logic for implementing the system resides on one or more of the system memory 806 and the memory devices 808, 810 in accordance with certain examples. The processing unit 804 executes one or more computer executable instructions originating from the system memory 806 and the memory devices 808 and 810. The term "computer readable medium" as used herein refers to a medium that participates in providing instructions to the processing unit 804 for execution, and can include multiple physical memory components linked to the processor via appropriate data connections.

From the above description of the invention, those skilled in the art will perceive improvements, changes and modifications. Such improvements, changes and modifications within the skill of the art are intended to be covered by the present invention.

Having described the invention, the following is claimed:
1. A computer implemented method for measuring outside air temperature comprising the steps of:
    measuring temperature values over time, acquiring the temperature values from a sensor;
    determining a first order exponential decay of the measured values in real time that is based on a measured initial temperature value and a transient response step size comprising the estimated time constant of exponential decay;

predicting a final value of the first order exponential decay series using a mathematical model based on the magnitude of the transient response step size; and discriminating against thermal noise components existing in the temperature values to arrive at a final temperature value.

2. The method of claim 1, wherein the step of determining further comprises the steps of:

plotting the temperature values as data points on a coordinate system of temperature versus time;

determining an angle formed between a line connecting a given data point of the data points and another data point of the data points and a horizontal line parallel to the independent variable axis, the given and the other data points being separated by an elapsed time; and determining the first order exponential decay based on the angle, an initial angle estimate, and the elapsed time value.

3. The method of claim 2, wherein the step of determining the first order exponential decay further comprises calculating the first order exponential decay by the equation $\tau = -t_{(k)}/\ln(\theta_{t(k)}/\theta_0)$, wherein $\tau$ is the time constant of the exponential decay, $t_{(k)}$ is the time value since time zero, $\theta_{t(k)}$ is a computed angle at $t_{(k)}$, and $\theta_0$ is an initial angle estimate.

4. The method of claim 1, wherein the step of predicting further comprises the steps of:

determining a given area by computing an area under the exponential decay data series;

determining another area by computing a product of the difference between a given data point and another data point times an elapsed time;

determining a data split by taking the difference between the given area and the another area, dividing the difference by two, and adding the another area to the divided difference; and predicting a magnitude of the transient response step size and the final value based on the data split, the first order exponential decay, and an initial data value.

5. The method of claim 1, wherein the step of predicting further comprises the step of stabilizing the data by applying a trigonometric model employing a least squares approximation to calculate multiple data estimate sets based on the measured temperature values.

6. The method of claim 1, wherein the step of determining further comprises the step of referencing the measured values in real time to a empirical temperature data to determine an estimate of the first order exponential decay.

7. A system for measuring outside air temperature comprising:

a plurality of sensors to measure temperature values over time;

a controller comprising computer executable instructions in communication with the plurality of sensors, the controller configured to:

analyze the measured temperature values;

stabilize an exponential time decay constant by applying a least squares approximation based on the analyzed temperature values;

estimate a step size based on the stabilized exponential time decay constant;

determine a first order exponential decay of the analyzed temperature values in real time based on a measured initial temperature value and the step size;

predict a final value of an exponential decay series using a mathematical model based on the step size; and filter the predicted final value against thermal noise components existing in the temperature values based on the stabilized exponential time decay constant to arrive at a final temperature value.

8. The system of claim 7, wherein the controller does said analyzing by performing data compaction to yield a well-behaved exponentially decaying waveform.

9. The method of claim 7, wherein the controller determines the first order exponential decay of the measured values in real time by referencing the measured values to empirical data.

* * * * *